(12) United States Patent
Hashimoto et al.

(10) Patent No.: US 7,346,002 B2
(45) Date of Patent: *Mar. 18, 2008

(54) ELECTRONIC CONTROL UNIT

(75) Inventors: Kohji Hashimoto, Tokyo (JP); Katsuya Nakamoto, Tokyo (JP); Yuki Iwagami, Tokyo (JP); Akihiro Ishii, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 834 days.

This patent is subject to a terminal disclaimer.

(21) Appl. No.: 10/846,876

(22) Filed: May 17, 2004

(65) Prior Publication Data

US 2005/0080529 A1 Apr. 14, 2005

(30) Foreign Application Priority Data

Sep. 26, 2003 (JP) ............................ P2003-335653

(51) Int. Cl.
*G01R 31/08* (2006.01)
(52) U.S. Cl. ...................... 370/236; 370/242; 370/465; 701/36
(58) Field of Classification Search ........ 370/216–221, 370/225, 227, 228, 235, 236.1, 0.2, 241.1, 370/242, 300, 445, 447, 451, 465, 474; 709/201, 709/203, 208–211; 701/1, 36, 24, 29, 33; 340/425.5, 438; 710/5, 20, 61, 37, 14; 307/10.1; 700/2, 3; 714/33, 47; 123/480, 486
See application file for complete search history.

(56) References Cited

U.S. PATENT DOCUMENTS 4,760,275 A * 7/1988 Sato et al. .................. 340/438
5,812,880 A * 9/1998 Goto et al. ................... 710/37

FOREIGN PATENT DOCUMENTS

| JP | 09-162814 A | 6/1997 |
|---|---|---|
| JP | 2002-108835 A | 4/2002 |
| JP | 2002-235598 A | 8/2002 |
| JP | 2002-333901 A | 11/2002 |

* cited by examiner

*Primary Examiner*—Doris H. To
*Assistant Examiner*—Ian N. Moore
(74) *Attorney, Agent, or Firm*—Sughrue Mion, PLLC

(57) ABSTRACT

A first control circuit section (master station) and a second control circuit section (substation) communicate with each other via series-parallel converters. The master station includes regular transmission device and transmission-permitting signal generation device; and the sub station includes regular report device, confirmation reply device relative to a transmission data from the master station, and an unprocessed data table. The unprocessed data table prevents jam-up in upstream communication from the sub station to the master station, enabling to carry out timely regular transmission and regular reporting. Transmission from the sub station to the master station is performed based on a transmission-permitting control signal that the master station generates. Consequently, it is possible to execute communication error processing and diminish communication control burden on the master station while properly performing the regular transmission and regular report between the master station and sub station.

15 Claims, 14 Drawing Sheets

ELECTRONIC CONTROL UNIT

BACKGROUND OF THE INVENTION

1. Field of the Invention

The present invention relates to an electronic control unit having a microprocessor built-in for use in, for example, a fuel supply control of an automobile engine and, more particularly, to improvement of an on-vehicle electronic control unit including a plurality of control circuit sections electrically divided so as to carry out mutual communication of serial signals.

2. Description of the Related Art

On-vehicle electronic control unit in which information exchange by a method of serial communication is carried out among a plurality of microprocessors sharing functions, and communication error is detected to carry out error processing, has been practically and widely used in various fields.

For example, according to the Japanese Patent Publication (unexamined) No. 108835/2002, the following "On-Vehicle Electronic Control Unit" is proposed. This on-vehicle electronic control unit comprises serial communication means that is constituted of a main CPU and a sub CPU, and is capable of transferring a control constant at the time of start of operation and mutually communicating a variety of data during the operation freely. Further disclosed in this on-vehicle electronic control unit are means for sum check error and retransmission processing relative to serial communication data, means for timeout check error and reset processing of microprocessor, or means for inhibition processing of control output.

According to the Japanese Patent Publication (unexamined) No. 333901/2002, another "On-Vehicle Electronic Control Unit" is proposed. This on-vehicle electronic control unit comprises serial communication means that is constituted of an integrated circuit section having a microprocessor and a communication control circuit, and is capable of transferring a control constant at the time of start of operation and mutually communicating a variety of data during the operation. In this on-vehicle electronic control unit, an example of a communication packet arrangement is described in detail.

On the other hand, according to the Japanese Patent Publication (unexamined) No. 162814/No. 9, the following "Communication Monitoring Unit" has been proposed. This communication monitoring unit comprises a communication control section that controls data communication and outputs an error notification signal upon detecting any communication error, an error counter that counts up in response to the input of the mentioned error notification signal, and an annunciation section that announces a communication error in response to the fact that a count value of this error counter has reached a plus predetermined value (threshold). In this communication-monitoring unit, there is provided counter subtraction means that counts down a count value of the mentioned error counter upon the fact that the control of data communication is normally carried out in the mentioned communication control section. Further it is arranged so as to prevent an alarm generation in vain with respect to a sporadic and chronic error in which an error state automatically recovers, while immediately making an annunciation with respect to a fatal and continuous failure.

As for the rest, associated with this invention, according to the Japanese Patent Publication (unexamined) No. 235598/2002, the following "Vehicle Control Unit" is proposed. In this vehicle control unit, there are proposed error occurrence storage means and drive-stopping means of a specified electrical load that bring any microprocessor such as main CPU or sub CPU contained in an on-vehicle electronic device in a save operation state, when the microprocessor runs away, and then restarts the microprocessor.

According to "On-Vehicle Electronic Control Unit" of the Japanese Patent Publication (unexamined) No. 108835/2002, five types of packets of A•control constant transmission, B•transmission of regular data, C•transmission of irregular data, D•transmission of readout request command, E•transmission of required data are applied in the communication from a main CPU to a sub CPU (hereinafter referred to as downstream communication).

Likewise, in the communication from a sub CPU to a main CPU (hereinafter referred to as upstream communication), all the communication packets of B-E, except for A•control constant transmission, are applied on an equal basis.

Furthermore, a receiving confirmation reply or a retransmission request can be made with respect to each of the upstream and downstream communications, so that an extremely high degree of freedom is achieved. A problem, however, exists in that a communication jam-up takes place at the time of occurrence of some sort of communication error making it incapable to carry out transmitting and receiving an essentially required data.

According to "On-Vehicle Electronic Control Unit" of the Japanese Patent Publication (unexamined) No. 333901/2002, types of a communication packet is enormously reduced. In this control unit, 5 types of communication packets of A•control constant transmission, B•whole input readout request, C•whole output transmission, D•specific input readout request specifying an address, E•specific output transmission specifying an address as a downstream communication are applied from a master station to a sub station; while no spontaneous upstream communication packet from the sub station to the master station is prepared.

Accordingly, reporting from the sub station cannot be carried out without request from the master station, and therefore a regular request comes to be necessary in the case of presence of any regular report data, eventually resulting in a problem that unnecessary downstream communication takes place.

According to "Communication Monitoring Unit" of the Japanese Patent Publication (unexamined) No. 162814/1997, there remain the following problems. That is, a problem exists in that in case of setting a threshold for determining an error to a large value, any response delay is generated in detection of error occurrence subsequent to a normal communication. On the other hand, in case of setting a threshold for determining an error to a small value, too-sensitive error detection is carried out even when any slight and sporadic error occurs.

Moreover, response to a variety of numerous communication errors and processing of timeout error or retransmission are not described from a comprehensive viewpoint.

According to "Vehicle Control Unit" of the Japanese Patent Publication (unexamined) No. 235598/2002, a problem exists in that although timeout in communication can be detected by monitoring the run-away of a microprocessor, communication error in terms of lack or mix in bit such as sum check error is not monitored.

SUMMARY OF THE INVENTION

The present invention was made to solve the above-discussed problems and has an object of providing an electronic control unit that includes first and second control circuit sections electrically divided so as to perform mutual communication of a serial signal, the electronic control unit being arranged such that the mutual communication is carried out between the first control circuit section acting as a master station and the second control circuit section acting as a sub station while avoiding a communication jam-up; and furthermore confirmation of the presence or absence of any communication error, and a retransmission processing relative to various communication packets can be easily carried out, thereby enabling to diminish burden required for the communication control of a microprocessor especially on the master station side.

An electronic control unit according to the invention is arranged such that a first control circuit section is provided with a program memory including input/output control means and communication control means, an operation processing RAM memory, a microprocessor cooperating with the mentioned program memory, and a first series-parallel converter. A second control circuit section is provided with a communication control circuit section for performing communication of a monitoring and control signal, a data memory, and a second series-parallel converter. The mentioned first control circuit section and second control circuit section mutually carries out serial communication of monitoring signal and control signal via the mentioned first and second series-parallel converters. This electronic control unit is characterized in that: the mentioned first control circuit section includes regular transmission means and transmission-permitting control signal generation means, and the mentioned second control circuit section includes confirmation reply means, regular report means, and an unprocessed data table.

The mentioned regular transmission means is means for regularly transmitting a control output data or a constant set data from the mentioned first control circuit section to the mentioned second control circuit section, and for writing and storing an output and set data having been normally received at the mentioned second control circuit section in the mentioned data memory.

The mentioned confirmation reply means is means for executing a confirmation reply of whether the mentioned second control circuit section has normally received or failed to receive data to be transmitted from the mentioned regular transmission means, and for requesting a retransmission processing from the first control circuit section to the second control circuit section in case of the receiving failure.

The mentioned regular report means is means for regularly reporting a monitoring input data and status information from the mentioned second control circuit section to the mentioned first control circuit section, and for storing the regular report data that said first control circuit section has normally received in the mentioned operation processing RAM memory.

The mentioned unprocessed data table acts as a receiving-side command memory of a first-in first-out structure that is provided in the mentioned second control circuit section, and arranged so as to sequentially save a command data for executing the mentioned regular report and a command data for executing a confirmation reply, and to sequentially erase the mentioned saved command data when transmitting a regular report and confirmation reply data to the mentioned first control circuit section.

The mentioned transmission-permitting control signal generation means is control signal transmission means from the mentioned first control circuit section to the mentioned second control circuit section, by which the second control circuit section having received the mentioned signal starts to execute the transmission of the most first-in leading command in the mentioned unprocessed data table, and adds the latest monitoring input data and status information thereto and transmits a resulting command in the case where the mentioned leading command is a regular report.

As described above, the electronic control unit according to the invention is arranges such that the first control circuit section and the second control circuit section carry out serial communication of monitoring and control signals with each other via the first and second series-parallel converters. In this electronic control unit, the mentioned first control circuit section includes regular transmission means and transmission-permitting control signal generation means; and the mentioned second control circuit section includes confirmation reply means, regular report means and an unprocessed data table. Further, a confirmation reply command relative to a regular transmission data provided by the mentioned regular transmission means and a regular report command data provided by the regular report means are once stored in the mentioned unprocessed data table, and then sequentially transmitted in response to the mentioned transmission-permitting control signal; and the latest monitoring input data and status information are added, and the resulting data is transmitted in the case where a transmission command is a regular transmission command.

As a result, it is possible for the second control circuit section to carry out the regular report at one's own initiative even if no request is made from the first control circuit section. This regular reporting is carried out based on a transmission-permitting control signal that the first control circuit section generates, thereby enabling to diminish a communication control burden on the first control circuit section.

Further, in the case where the generation of a transmission-permitting control signal is delayed due to busy situation of the first control circuit section, or where the confirmation reply and the regular report take place at substantially the same time, transmission standby is carried out using the unprocessed data table thereby preventing the communication jam-up. Consequently, it is possible to further diminish the communication burden on the first control circuit section.

Furthermore, an advantage is provided such that it is possible to transmit the latest information at the moment of transmission of the regular report with respect to the first control circuit section.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
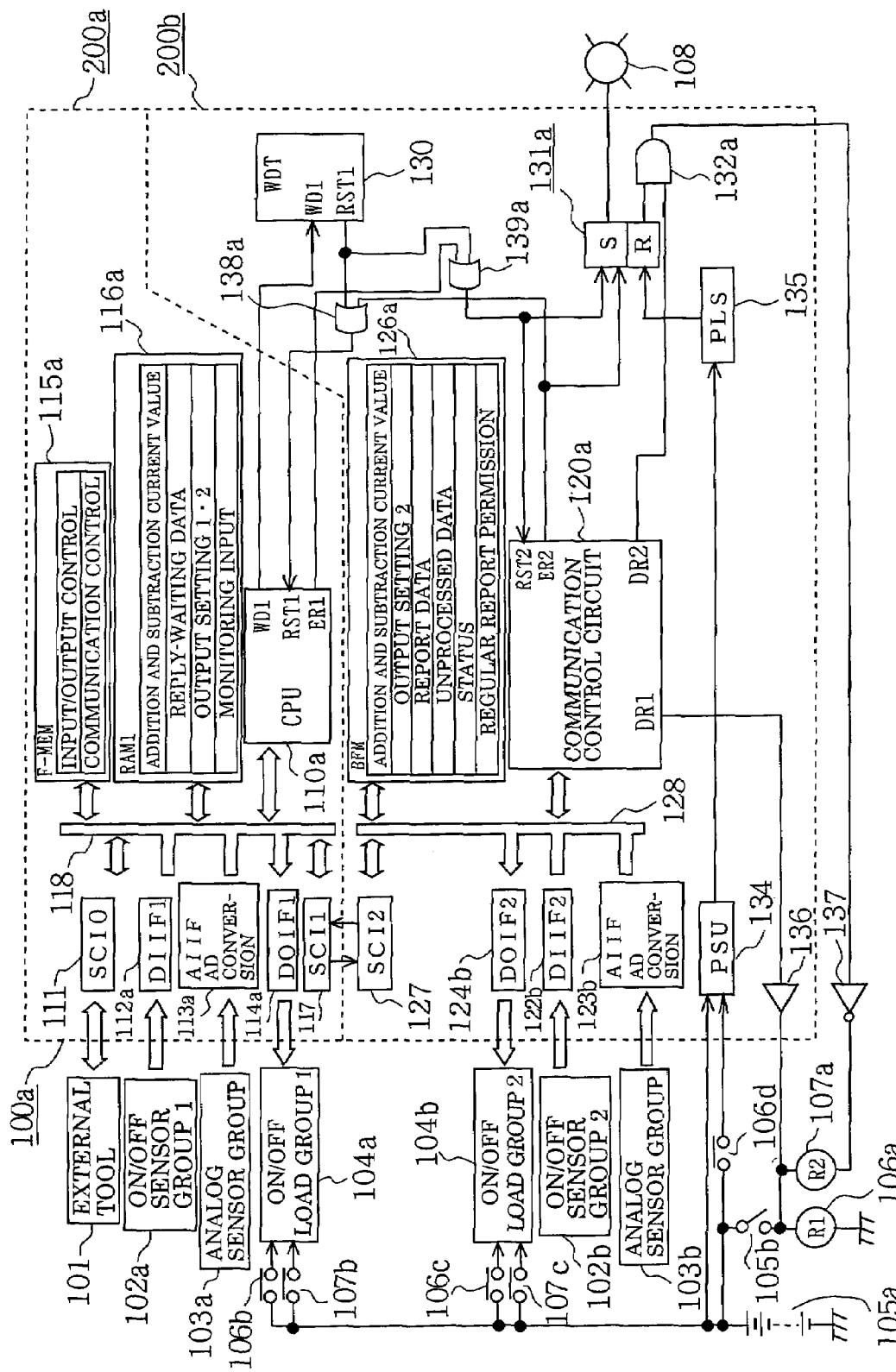
FIG. 1 is a block diagram showing an entire constitution of an electronic control unit according to a first embodiment.

Several preferred embodiments according to the present invention are hereinafter described with reference to the drawings.

Throughout the drawings, like reference numerals are designated to the same or like parts.

Embodiment 1

FIG. 1 is a block diagram showing an entire constitution of an electronic control unit according to a first embodiment.

With reference to FIG. 1, reference numeral 100a designates an electronic control unit consisting of a first control circuit section 200a and a second control circuit section 200b.

First, components connected to the outside of the mentioned electronic control unit 100a are described.

Numeral 101 designates an external tool. This external tool is connected via a detachable connector, not shown, to the mentioned electronic control unit 100a at the time of delivering a product or carrying out a maintenance inspection, and functions to transfer and write a control program or a control constant to the later-described non-volatile program memory 115a.

Numeral 102a designates a first input sensor group that performs an ON/OFF operation (for example, an engine speed sensor, a crank angle sensor, and a speed sensor). This first input sensor group performs a relatively high-speed and high-frequency operation, and acts as a sensor group the input of which needs to be directly fetched in with respect to the later-described main CPU 110a.

Numeral 102b designates a second input sensor group that performs an ON/OFF operation (for example, a selected position sensor of transmission shift lever, an air-conditioner switch, an idle-position detecting switch of an accelerator pedal, a power steering operation switch, and a break switch). This second input sensor group 102b performs a relatively low-frequency operation, and acts as a sensor group in which delay in fetching signals does not matter much.

Numeral 103a designates a first analog sensor group (for example, an airflow sensor measuring an air-intake of throttle, an accelerator position sensor for measuring a depression degree of the accelerator pedal, and a throttle position sensor measuring an opening of throttle valve. This first analog sensor group 103a performs a relatively sharp output change, and acts as a sensor group the signal of which needs to be directly fetched in with respect to the later-described main CPU 110a.

Numeral 103b designates a second analog sensor group (for example, a coolant temperature sensor, an intake-air temperature, and an atmospheric pressure sensor). This second analog sensor group 103b performs a relatively slow output change, and acts as a sensor group in which delay in fetching signals does not matter much.

Numeral 104a designates a first electrical load group (for example, a fuel injection solenoid valve, an ignition coil, and an open/close controlling motor of intake-air throttle). This first electrical load group 104b performs a relatively high-frequency operation, and acts as an electrical load group of an ON/OFF operation that needs to generate a drive output without delay.

Numeral 104b designates a second electrical load group (for example, an air-conditioner driving electromagnetic clutch or a transmission stage shifting solenoid valve of the transmission). This second electrical load group 104b performs a relatively low-frequency operation, and acts as an electrical load group of an ON/OFF operation in which response delay of a drive output does not matter much.

Numeral 105a designates an external power supply feeding an electric power to the mentioned electronic control unit 100a or the first and second electrical load groups 104a and 104b. Numeral 105b designates a power supply switch. Numeral 106a designates a power supply relay including output contacts 106b, 106c and 106d. Numeral 107a designates a load power supply relay including output contacts 107b and 107c. The mentioned power supply relay 106a is energized from the mentioned external power supply 105a via the mentioned power supply switch 105b, and closes a power supply circuit with respect to the mentioned first and second electrical load groups 104a and 104b by the output contacts 106b and 106c. Further, the mentioned power supply relay 106a closes a power feed circuit from the mentioned external power supply 105a with respect to the electronic control unit 100a by the output contact 106d.

Furthermore, the mentioned external power supply 105a and electronic control unit 10a also include a direct connection circuit so that the electromagnetic control unit 100a may be fed with an electric power in sleep mode even when the mentioned power supply switch 105b is open.

In addition, even in the state that the operation of the microprocessor is stopped and the electromagnetic control unit is not operated, feeding a small amount of electric power continues in order to maintain a part (or all) of a storage state of the later-described RAM memory 116a. Such power feed state is referred to as a power feed in sleep mode.

Further, a part of the mentioned first and second electrical load groups 104a and 104b are arranged so that a power supply circuit thereof may be closed via the output contacts 107b and 107c of the mentioned load power supply relay 107a.

Numeral 108 designates an alarm and display acting as annunciation means, which is driven from the mentioned electronic control unit 100a and mounted in such a position as can be visually watched by an operator.

Now, internal constitution of the first control circuit section 200a is described.

Numeral 110a designates a main CPU, being a microprocessor of 32 bits, for example. Numeral 111 designates a serial interface for a tool that is serially connected to the mentioned external tool 101. Numeral 112a designates a direct input signal interface circuit that is connected in parallel to the mentioned first input sensor group 102a. Numeral 113a designates a multi-channel AD converter that is connected to the mentioned first analog sensor group 103a. Numeral 114a designates a direct output signal interface circuit that is connected in parallel to the mentioned first electrical load group 104a. Numeral 115a designates a non-volatile program memory such as flash memory. Numeral 116a designates a RAM memory for operation processing. Numeral 117 designates a first series-parallel converter acting as a master station. Numeral 118 designates a data bus. The mentioned serial interface 111, first series-parallel converter 117, AD converter 113a, direct input/output signal interface circuits 112a and 114a, program memory 115a, RAM memory 116a and main CPU 110a are mutually connected through the mentioned data bus 118. The one that is specified by means of an address bus or a chip select circuit, not shown, communicates with the mentioned CPU 110a.

Furthermore, written in the mentioned program memory 115a are a program acting as input/output control means and that acting as communication control means.

In addition, written in the mentioned RAM memory 116a are a current value data of the later-described first adder-subtracter, an output set data with respect to the mentioned first and second electrical load groups 104a and 104b, the later-described reply waiting command data, a monitoring input data such as indirect input information or status information having been reported from the mentioned second control circuit section 200b, etc.

Now, internal constitution of the second control circuit section 200b is described.

Numeral 120a designates an associative control circuit section (it is also referred to as communication control circuit section) the main part of which is the later-described communication control circuit section. Numeral 122b designates an indirect input signal interface circuit that is connected in parallel to the mentioned second input sensor group 102b. Numeral 123b designates a multi-channel AD converter that is connected to the mentioned second analog sensor group 103b. Numeral 124b designates an indirect output signal interface circuit that is connected in parallel to the mentioned second electrical load group 104b. Numeral 126a designates a data memory to be connected to the later-described data bus 128 by a chip select signal, not shown. Numeral 127 designates a second series-parallel converter that is serially connected with respect to the mentioned series-parallel converter 117. Numeral 128 designates a data bus. The mentioned second series-parallel converter 127, indirect input/output signal interface circuits 122b and 124b, AD converter 123b, data memory 126a and associative control circuit section 120a are mutually connected through the mentioned data bus 128.

In addition, written in the mentioned data memory 126a are a current value data of the later-described second adder-subtracter, an output set data or a regular report permission command data with respect to the second electrical load group 104b having been transferred from the mentioned main CPU 110a, or the later-described unprocessed command data, and a report data to be transmitted to the main CPU 110a, a status information and the like.

In this arrangement, the indirect input signal or the indirect output signal means an input/output signal to be communicated with the microprocessor 110a or a microprocessor 110b described later in a second embodiment acting as a main CPU by serial communication via the first and second series-parallel converters 117 and 127. On the other hand, the direct input signal or the direct output signal means an input/output signal to be directly connected to the microprocessor 110a or the microprocessor 110b acting as a main CPU without via the first and second series-parallel converter 117 and 127.

In addition, the electronic control unit according to this first embodiment is constituted so as to be divided into two parts of the first control circuit section 200a and the second control circuit section 200b via a serial communication section (i.e., first and second series-parallel converters). Further, the first control circuit section 200a uses the second control circuit section 200b in combination, and there is provided an associative control circuit section 120a as a central part of the second control circuit section 200b to be used in combination.

Since the main component of the associative control circuit section 120a is a communication control circuit, numeral 120a is hereinafter referred to as a communication control circuit section.

Numeral 130 designates a watchdog timer. This watchdog timer 130 monitors a watchdog clear signal WD1, being a pulse train generated by the mentioned main CPU 110a, and generates a reset pulse signal RST1 to cause the mentioned main CPU 110a to restart when a pulse width of the foregoing watchdog clear signal WD1 exceeds a predetermined value.

Further, the mentioned main CPU 110a generates the later-described first error detection signal ER1.

In addition, the mentioned communication control circuit section (associative control circuit section) 120a generates the later-described second error detection signal ER2, a drive output DR1 with respect to the mentioned power supply relay 106a, and a drive output DR2 with respect to the mentioned load power supply relay 107a.

Numeral 131a designates an error storage circuit constituted of a flip-flop circuit that includes a set input S and a reset input R. This error storage circuit 131a stores operation of the mentioned reset pulse signal RST1 or first and second error detection signals ER1 and ER2 to drive the mentioned alarm and display 108.

Numeral 132a designates drive stop means acting as a gate element. Numeral 134 designates a power supply unit. Numeral 135 designates a power supply detection circuit. Numeral 136 designates a drive element. Numeral 137 designates an inverting drive element. The mentioned power supply unit 134 is directly fed with an electric power from the mentioned external power supply 105a or fed with power via the output contact 106d of the mentioned power supply relay 106a, and generates a stabilizing control power supply output to be used in the mentioned electronic control unit 100a.

Further, the mentioned power supply detection circuit 135 detects the fact that the mentioned power supply switch 105b is closed, and resets the mentioned error storage circuit 131a to initialize it.

The mentioned drive element 136 drives the mentioned power supply relay 106a by the mentioned drive output DR1, and continues to hold the operation of the power supply relay 106a until the drive output DR1 is stopped even if the mentioned power supply switch 105b is closed.

The mentioned inverting drive element 137 drives the mentioned load power supply relay 107a through the terminal of the mentioned drive output DR2 via the mentioned drive stop means 132a. Further, the foregoing load power supply relay 107a operates when an drive output DR2 is generated and the error storage circuit 131a stores no error.

In addition, it is arranged such that the mentioned load power supply relay 107a is de-energized upon de-energization of the mentioned power supply relay 106a; while only the load power supply relay 107a is made de-energized even if the power-supply relay 106a is energized thereby enabling to stop the power feed with respect to a part of electrical loads.

Numeral 138a designates an OR element the inputs of which are the mentioned reset pulse signal RST1 and second error detection signal ER2. The output from the foregoing OR element 138a is connected to a reset input terminal RST1 of the mentioned main CPU 110a.

Numeral 139a designates an OR element the inputs of which are the mentioned reset pulse signal RST1 and first error detection signal ER1. The output from the foregoing OR element is connected to a reset input terminal RST2 of the mentioned communication control circuit section 120a and a set input terminal of the mentioned error storage circuit 131a.

Figure 2:
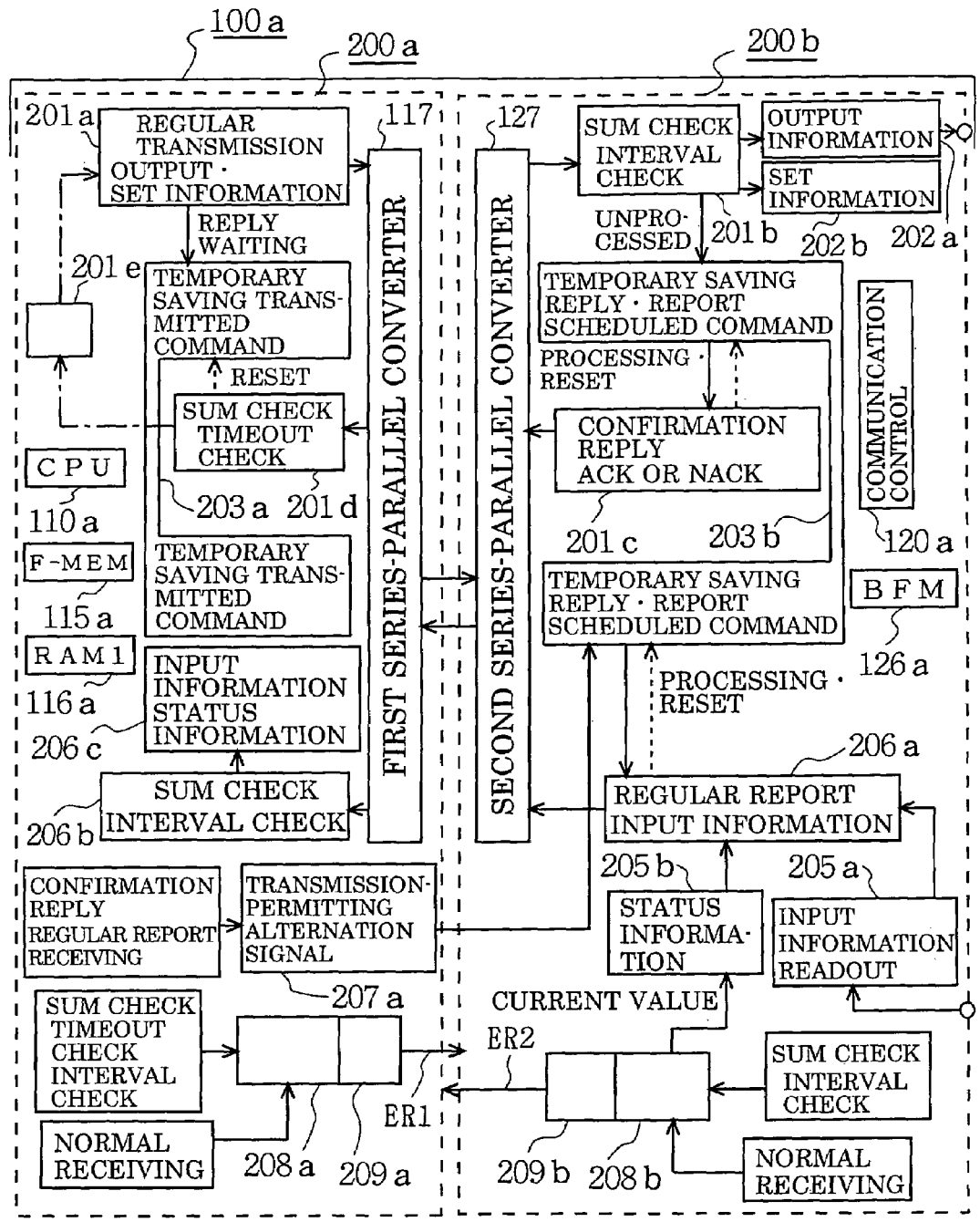
FIG. 2 is a block diagram for explaining a communication control operation of the electronic control unit according to the first embodiment.

FIG. 2 is a block diagram for explaining a communication control operation of the electronic control unit according to the first embodiment shown in FIG. 1. A communication control block of the electronic control unit according to the first embodiment is hereinafter described referring to FIG. 2.

With reference to FIG. 2, signals to be exchanged between the first control circuit section 200a including the first series-parallel converter 117 (hereinafter also referred to as a master station) and the second control circuit section 200b including the second series-parallel converter 127 (hereinafter also referred to as a sub station) are generally classified as follows.

Numeral 201a designates regular transmission means the signal of which is prepared at the master station and transmitted from the master station to the sub station. The signal provided by the foregoing regular transmission means is transmitted from the master station at one's own initiative in substantially a regular manner even if there is no request from the sub station side. Further, an upper limit value of a time period interval is controlled so as to be not more than a predetermined value.

In addition, data to be transmitted by the mentioned regular transmission means 201a include output information and various set constants, not shown, to be outputted to the second electrical load group 104b of FIG. 1.

Numeral 201b designates second communication error determination means that is performed at the sub station side having received a communication packet provided from the mentioned regular transmission means 201a. Numerals 202a and 202b designate respectively output information storage means and set information storage means that store a regular transmission data having been normally received via the foregoing determination means in mentioned data memory 126a. Numeral 203b designates an unprocessed data table that sequentially stores a normal receiving ACK or a receiving failure NACK as a reply command data responsive to the transmission from the master station to the sub station. Numeral 201c designates confirmation reply means by which the confirmation is replied from the sub station to the master station. This confirmation reply means corresponds to a leading reply command data having been stored at the earliest time and remained in the mentioned unprocessed data table 203b. Further, a leading reply command data in the mentioned unprocessed data table 203b is deleted accompanied by the transmission of a communication packet provided by the confirmation reply means 201c.

Numeral 203a designates a reply-waiting data table that sequentially stores a transmission command data when transmitting a communication packet provided by the mentioned regular transmission means 201a on the master station side. Numeral 201d designates first communication error determination means performed on the master station side having received a reply data from the sub station. Numeral 201e designates retransmission request means. Further, a leading command data, which is stored in the mentioned reply-waiting data table 203a, is deleted when the determination of the mentioned determination means 201d is normal receiving.

Furthermore, when the mentioned determination means 201d normally receives the receiving failure data NACK of the sub station side, or when the determination means 201d makes a determination of the receiving error relative to a reply data, it is arranged such that a retransmission processing is carried out by the regular transmission means 201a based on the request from the mentioned retransmission request means 201e. Further, an old data retained in the mentioned reply-waiting data table 203a is deleted accompanied by the foregoing retransmission processing, and a transmission command data having been retransmitted is stored anew.

In addition, a reply command data corresponding to the mentioned regular transmission means 201a and a regular report command data corresponding to the later-described regular report means 206a are synthesized and stored in order of generation. These data are replied sequentially in such a manner that the older ones are fetched out on the first-in first-out basis.

Numeral 206a designates regular report means for regularly transmitting to the master station input information 205a and status information 205b on the sub station side. This regular report is transmitted from the sub station at one's own initiative and substantially regularly. Further, an upper limit value of a time period interval is controlled so as to be not more than a predetermined value.

Numeral 206b designates first communication-error determination means that is performed on the master station side having received a regular report data from the sub station. Numeral 206c designates storage means of the input information and status information that stores the mentioned regular report data in the mentioned RAM memory 116a when the mentioned determination means 206b determines the normal receiving.

In addition, the input information 205a to be transmitted by the mentioned regular report means 206a includes an indirect input signal provided by the second input sensor group 102b or the second analog sensor group 103b of FIG. 1. The status information 205b includes transmission current value information at the later-described second adder-subtracter 208b representing a state of the second control circuit section 200b.

Numeral 207a designates transmission-permitting control signal generation means by which a logic level inverts alternately every time the first control circuit section 200a receives either the confirmation reply or the regular report from the second control circuit section 200b. A leading command in the mentioned unprocessed data table 203b is transmitted in response to the foregoing transmission-permitting control signal.

The first communication error determination means at the mentioned determination means 201d and 206b includes bit error determination means for determining the presence or absence of lack or mix in bit information such as parity check or sum check relative to a serial data having been replied or reported from the sub station to the master station.

Further, first communication error determination means at the mentioned determination means 201d includes reply response error determination means for making an error determination when a save time period of the oldest transmission command data remained in the mentioned reply-waiting data table 203a exceeds a predetermined reply response time period.

Furthermore, first communication error determination means at the mentioned determination means 206b includes receiving interval error determination means that makes an error determination when a receiving interval time period of the master station relative to a regular report data, which the sub station transmits, exceeds a predetermined value.

Likewise, second communication error determination means at the mentioned determination means 201b includes bit error determination means for determining the presence or absence of lack or mix in bit information such as parity check or sum check relative to a serial data having been transmitted from the master station to the sub station.

Further, second communication error determination means at the mentioned determination means 201b includes receiving interval error determination means that makes an error determination when a receiving interval time period of the sub station relative to a regular transmission data, which the master station transmits, exceeds a predetermined value.

Numeral 208a designates first adder-subtracter, which is constituted of a reversible counter, for example, and an initial value of which is set to "9" and a current value of which is restricted so as not to be less than 0. The foregoing adder-subtracter operates to add a second variation value "3" when error determination is made by the mentioned first communication-error determination means 201d and 206b, and to subtract a first variation value "1" when normal determination is made the mentioned determination means 201d and 206b.

Numeral 209a designates first error occurrence definition means. This definition means 209a is constituted of a comparison circuit that generates a first error detection signal ER1 when a current value of the mentioned adder-subtracter 208a exceeds "11".

Similarly, numeral 208b designates second adder-subtracter, which is constituted of a reversible counter, for example, and an initial value of which is set to "9" and a current value of which is restricted so as not to be less than 0. The foregoing adder-subtracter operates to add a second variation value "3" when an error determination is made by the mentioned second communication-error determination means 201b, and to subtract a first variation value "1" when the normal determination is made by the mentioned determination means 201b.

Numeral 209b designates second error occurrence definition means. This definition means 209b is constituted of a comparison circuit that generates a second error detection signal ER2 when a current value of the mentioned second adder-subtracter 208b exceeds "11".

Figure 3:
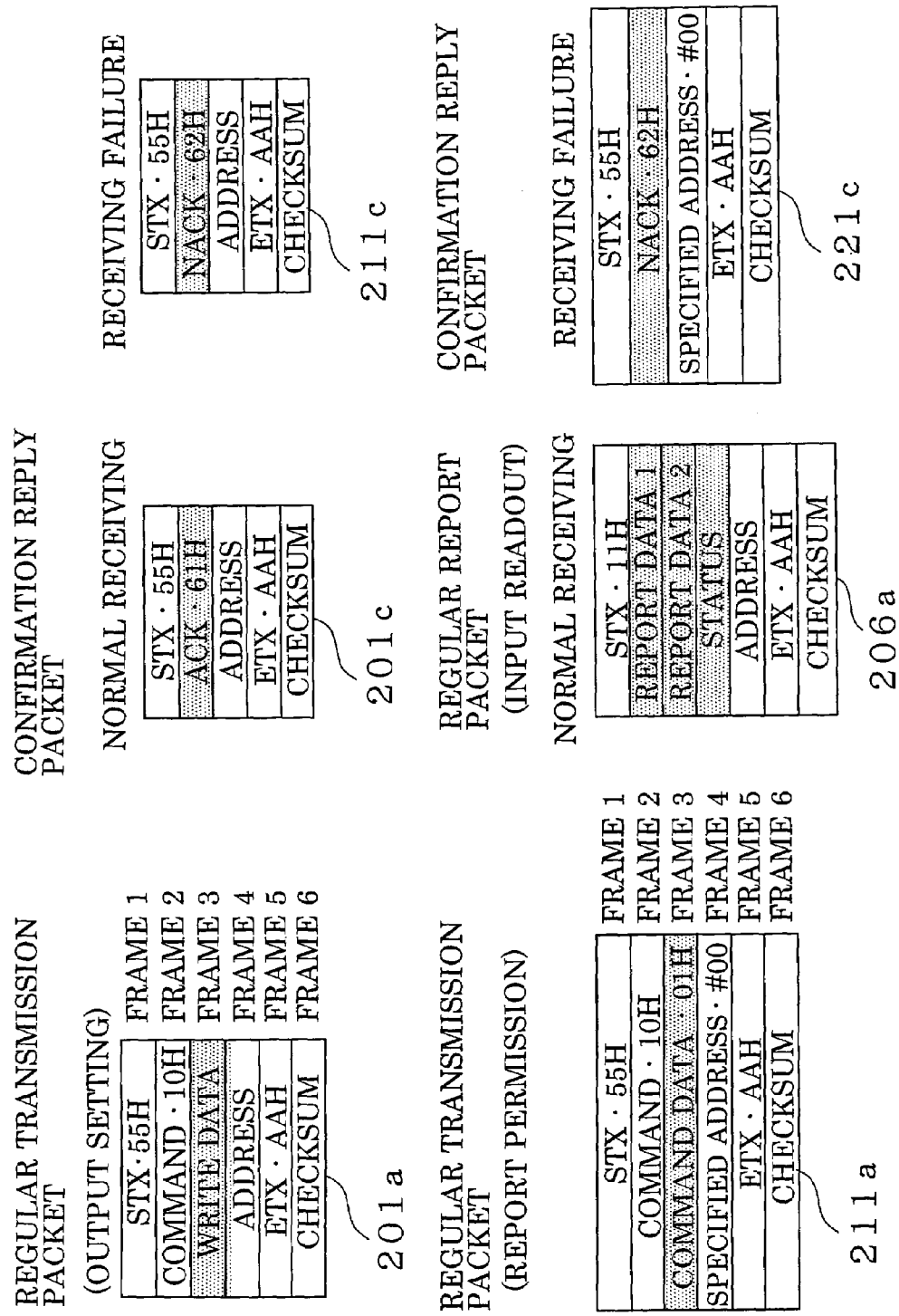
FIG. 3 is a diagram showing several constitutions of communication packet in the electronic control unit according to the first embodiment.

FIG. 3 shows a block diagram of a packet of serial communication in the electronic control unit according to the first embodiment shown in FIG. 1.

With reference to FIG. 3, numeral 201a designates communication packet acting as regular transmission means from the master station to the sub station. This regular transmission packet consists of frames 1 to 6 being a start data 55H, a command 10H, a write data, a storage location address, an end data AAH and a checksum data.

Further, the mentioned H shows that each numerical value is given in hexadecimal numerals.

Numeral 201c designates a communication packet acting as confirmation reply means of the normal receiving (ACK) to be replied to the master station when it is the normal receiving. This confirmation reply packet consists of five frames of a start data 55H, an acknowledged data 61H, a storage location address, an end data AAH and a checksum data.

Numeral 211c designates communication packet acting as confirmation reply means of the receiving failure (NACK) to be replied to the master station when it is the abnormal receiving. This confirmation reply packet consists of five frames of a start data 55H, a non-acknowledged data 62H, a storage location address, and end data AAH and a checksum data.

In addition, an address of the mentioned confirmation reply packets 201c and 211c is the same as the address specified for the regular transmission packet 201a.

Numeral 211a designates a regular transmission packet including permission information for the regular report. This regular transmission packet 211a consists of 6 frames of a start data 55H, a command 10H, a command data 01H, a specified address #00, an end data AAH and a check sum data. Further, the mentioned command data is the one that permits the regular report as well as specifies a report cycle.

Numeral 206a a communication packet acting as the first regular report means to be relied to the master station when it is the normal receiving. This regular report packet consists of 7 frames of a start data 11H, a report data 1, a report data 2, status information, an address, an end data AAH, and a checksum data.

Numeral 221c designates communication packet acting as confirmation reply means to be replied to the master station when it is the abnormal receiving. This confirmation reply packet consists of 5 frames of a start data 55H, a non-acknowledged data 62H, a specified address #00, an end data AAH and a checksum data.

In addition, once the mentioned regular transmission packet 211a has been received, the mentioned regular report packet 206a is transmitted repeatedly within a predetermined time period until receiving again a regular transmission packet 211a the command data of which is changed to 00H.

Furthermore, a checksum data, which is shown in a frame 6 of the mentioned regular transmission packet 210a, is a complement value of a binary addition value of data from frame 1 to frame 5.

Accordingly, it is normal to obtain 0 as a result of the binary addition of all data from frame 1 to frame 6. This confirmation operation is referred to as sum check operation.

In the mentioned regular report packet 206a, in the case where the second analog sensor group 103b is not connected to the second control circuit section 200b and the second input sensor group 102b provides not more than 16 of ON/OFF signals, it becomes possible to report all monitoring inputs with a report data 1 and a report data 2, thus any address provided in the first frame being unnecessary.

Figure 4:
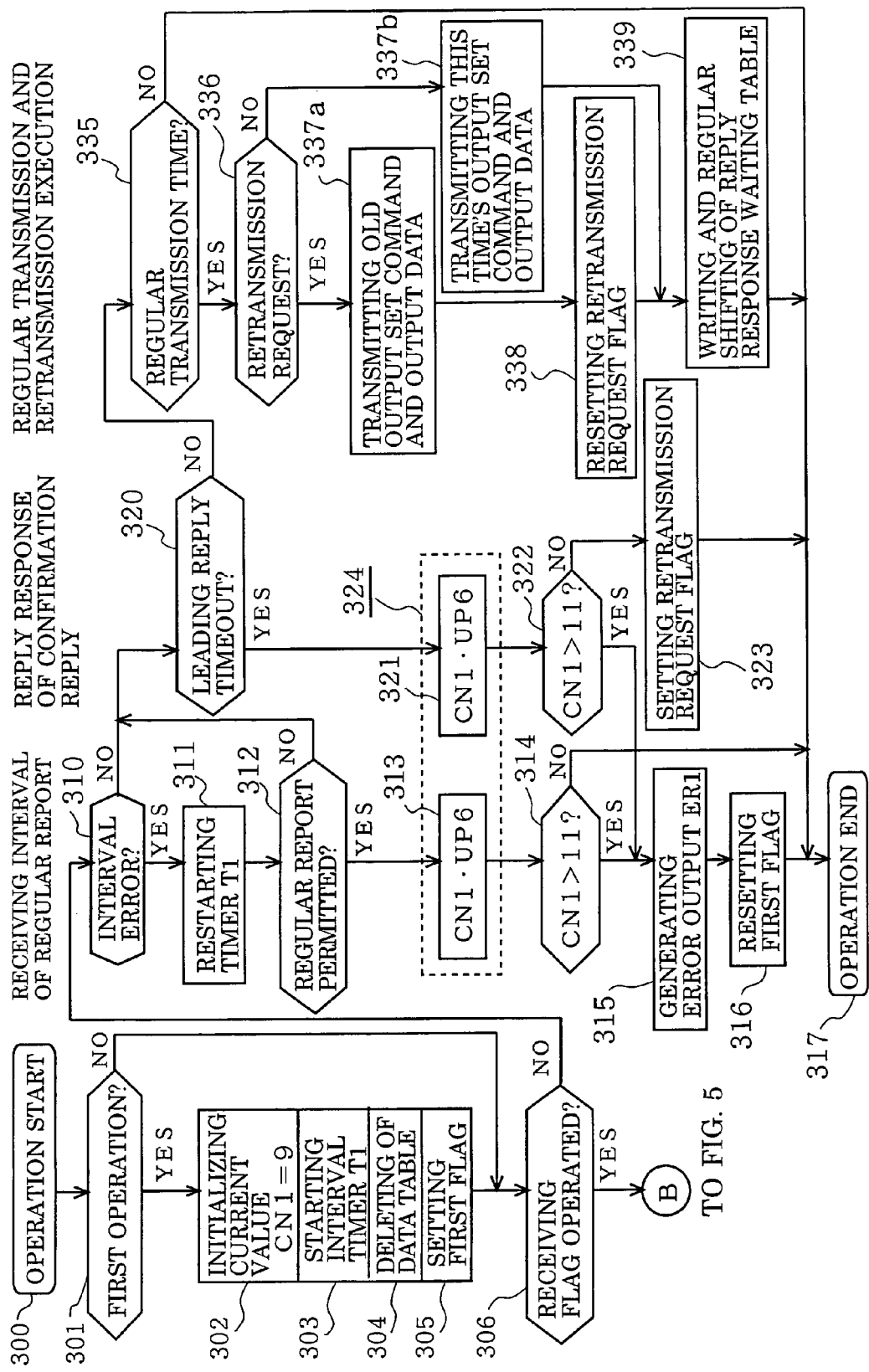
FIG. 4 is a flowchart for explaining a transmission operation at a first control circuit section of the electronic control unit according to the first embodiment.
Figure 5:
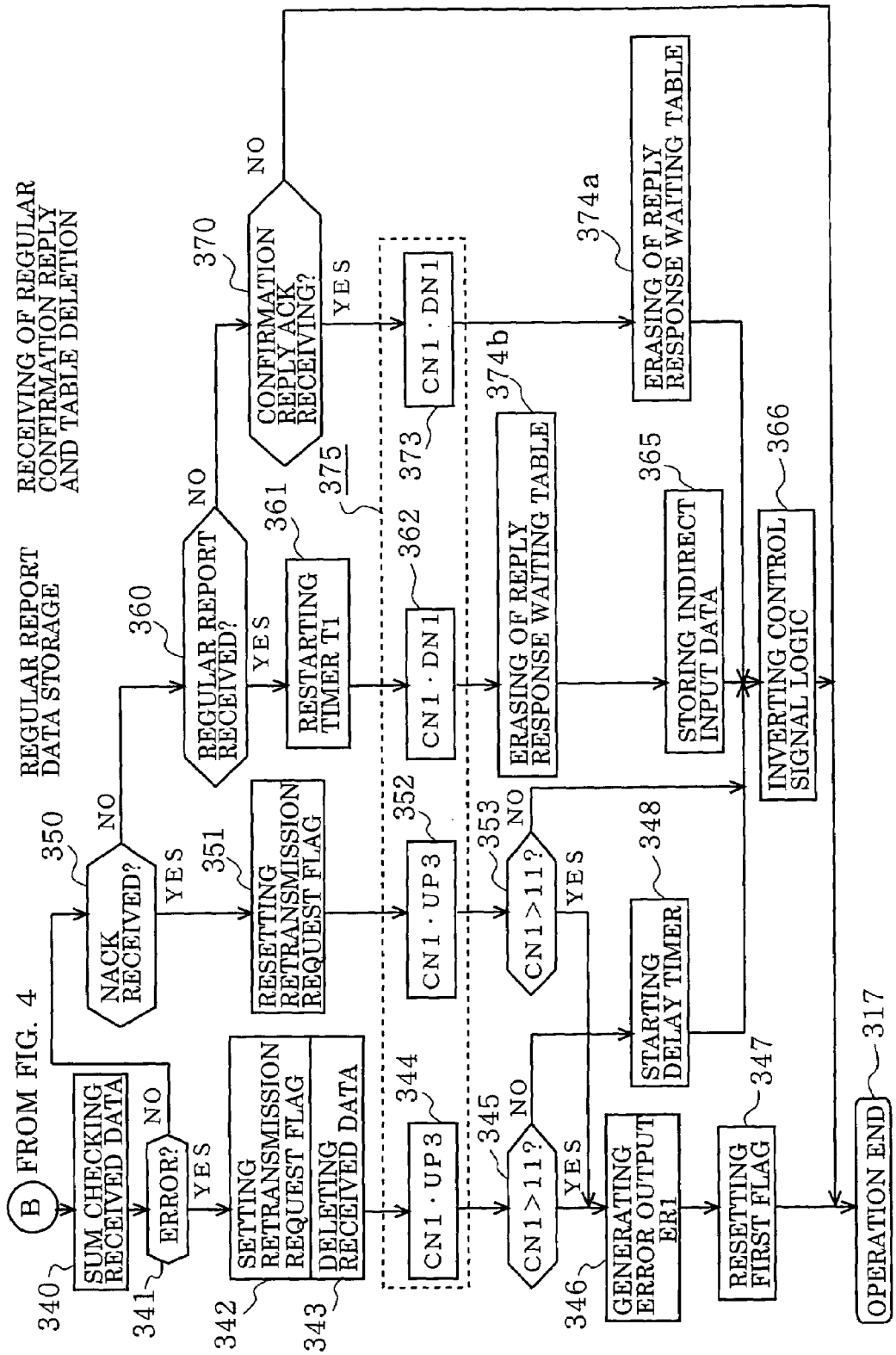
FIG. 5 is a flowchart for explaining a receiving operation at the first control circuit section of the electronic control unit according to the first embodiment.

Now, a communication control operation in the first control circuit section of the electronic control unit according to this first embodiment is described referring to flowcharts of FIGS. 4 and 5.

In addition, FIG. 4 shows mainly a flow of a transmission operation in the first control circuit section 200*a*. FIG. 5 shows mainly a flow of a receiving operation in the first control circuit section 200*a*.

With reference to FIG. 4, numeral 300 is an operation start step of the main CPU 110*a* that is regularly activated. That is, this start step 300 is activated when the power supply switch 105*b* of FIG. 1 is turned on and when a reset pulse signal RST1 is supplied to the main CPU 110*a*. The start step 300 operates in a circulating manner subsequently to the later-described operation end step 317.

Numeral 301 is a step that acts subsequently to the mentioned Step 300, and determines whether or not it is a first operation depending on whether or not a first flag is set in the later-described Step 305. Numeral 302 is a step that acts when the determination in the foregoing Step 301 is YES (first operation), and sets a current value of the first adder-subtracter 208*a* to an initial value "9". Numeral 303 is a step that acts subsequently to the foregoing Step 302, and starts up an interval timer T1 the interval of which corresponds to an upper limit value of the regular report cycle. Numeral 304 designates a step that acts subsequently to the foregoing Step 303, and deletes a content of the reply-waiting data table 203*a* of FIG. 2. Numeral 305 designates a step that acts subsequently to the foregoing Step 304, and sets the first flag not shown. The mentioned first flag is reset when the power supply switch 105*b* of FIG. 1 is turned on and when a reset pulse signal RST1 is supplied to the main CPU 110*a*.

Numeral 306 is a step that acts when the determination in the mentioned Step 301 is NO (it is not the first operation), or subsequently to the mentioned Step 305. This Step 306 determines whether or not operated is a receiving flag indicating the fact that the first series-parallel converter 117 has received a serial data having been transmitted from the second series-parallel converter 127 and that a parallel conversion completes. When the determination in the foregoing Step 306 is YES (receiving completes), the program proceeds to Step 340, shown in FIG. 8.

Numeral 310 is a step that acts when the determination in the mentioned Step 306 is NO (receiving flag is not operated yet), and determines whether or not the timer T1 having been started in the mentioned Step 303 and the later-described Step 311 or 361 (FIG. 5) is Time's Up. Numeral 311 is a step that acts when the determination in the foregoing Step 310 is YES (Time's Up), and restarts the timer T1. Numeral 312 is a step that acts subsequently to the foregoing Step 311, and determines whether or not the regular transmission has been permitted already by determining operation state of a permission-transmitting flag, not shown, that is set when the regular report permission is transmitted by a regular transmission packet 211*a*. Numeral 313 is a step that acts when the determination in the foregoing Step 312 is YES and the regular report permission has been given already, and adds 6 counts to a value of operation means CN1 acting as a first adder-subtracter.

Numeral 314 is a step that acts subsequently to the foregoing Step 313, and determines whether or not a current value of the operation means CN1 acting as the first adder-subtracter exceeds 11. Numeral 315 is a step that acts when the determination in the foregoing Step 314 is YES (in excess of 11), and generates a pulse output of the first error detection signal ER1. Numeral 316 is a step that acts subsequently to the foregoing Step 315, and resets the first flag having been set in the mentioned Step 305. Numeral 317 is an operation end step that acts when the determination in the mentioned Step 314 is NO (not more than 11), or subsequently to the mentioned Step 317. The mentioned operation start step 300 operates in a circulating manner subsequently to the foregoing Step 317.

Numeral 320 is a step that acts when the determination in the mentioned Step 310 is NO (timer T1 is not Time's Up), or when the determination in the mentioned Step 312 is NO and the regular report is not permitted yet. This Step 320 determines whether or not a save time period of the residual leading data of the reply-waiting data table (refer to numeral 203*a* of FIG. 2) having been written in the later-described Step 339 exceeds a predetermined reply response time period T. Numeral 321 is a step that acts when the determination in the foregoing Step 320 is YES (timeout), and adds 6 counts to a value of the operation means CN1 acting as the first adder-subtracter. Numeral 322 is a step that acts subsequently to the foregoing Step 321, and determines whether or not a current value of the operation means CN1 acting as the first adder-subtracter exceeds 11. When the determination in the foregoing Step 322 is YES (in excess of 11), the program proceeds to the mentioned Step 315.

Numeral 323 is a step that acts when the determination in the mentioned Step 322 is NO (not more than 11), and sets a retransmission request flag. The program proceeds to the mentioned operation end step 317 subsequently to this Step 323.

In addition, the mentioned reply-waiting data table 203*a* is constituted of plural stages of shift register in which a stored data shifts every predetermined time period. In response to the fact that a reply-waiting command having been stored in the foregoing shift register shifts to an overflow register, a timeout determination is made in the mentioned Step 320.

Numeral 335 is a step that acts when the determination in the mentioned Step 320 is NO (it is not timeout), and determines whether or not it is a time when carrying out the regular transmission with a regular transmission packet 201*a*. Numeral 336 is step that acts when the determination in the foregoing Step 335 is YES (it is the regular transmission time), and determines whether or not a retransmission request flag is set in the mentioned Step 323 or in the later-described Steps 342 and 351 (FIG. 5). Numeral 337*a* is a step that acts when the determination in the foregoing Step 336 is YES (retransmission request is present), and transmits a regular transmission packet 201*a* based on a transmission command having been transmitted already. Numeral 338 is a step that acts subsequently to the foregoing Step 337*a*, and resets the retransmission request flag.

Numeral 337*b* is a step that acts when the determination in the mentioned Step 336 is NO (retransmission request is absent), and transmits the regular transmission packet 201*a*. Numeral 339 is a step that acts subsequently to the mentioned Steps 337*b* and 338, and sequentially stores in the reply-waiting data table 203*a* a command having been transmitted in the mentioned Steps 337*a* and 337*b*. This Step 339 deletes the old leading regular transmission command and the address in the reply-waiting data table 203*a* by carrying out shift operation of the data table acting as a shift register. The program proceeds to the mentioned operation end 317 when the determination in the mentioned Step 335 is NO (it is not the regular transmission time), or subsequently to the mentioned Step 339.

Referring now to FIG. 5, numeral 340 is a step that acts when the determination in mentioned Step 306 (FIG. 4) is YES (receiving flag operates), and carries out a sum check of the received data.

In addition, a frame of a checksum, in which a binary addition of all frame data from a start data STX to an end data ETX is executed and a complement value thereof is stored, is added to each transmit-receive packet. Further, it is the sum check that performs the binary addition of all the frame data from a start data STX to a checksum data, and determines whether or not a result of this binary addition brings a normal value 00H.

Numeral 341 is a step that acts subsequently to the mentioned Step 340, and determines whether or not there is any error as a result of the sum check. Numeral 342 is a step that acts when the determination in the foregoing Step 341 is YES (error is present), and sets a retransmission request flag. Numeral 343 is a step that acts subsequently to the foregoing Step 342, and deletes the received data in which error is present. Numeral 344 is a step that acts subsequently to the foregoing Step 343, and adds 3 counts to a value of the operation means CN1 acting as the first adder-subtracter.

Numeral 345 is a step that acts subsequently to the mentioned Step 344, and determines whether or not a current value of the operation means CN1 acting as the first adder-subtracter exceeds 11. Numeral 346 is a step that acts when the determination in the foregoing Step 345 or the later-described Step 353 is YES (in excess of 11), and generates a pulse output of the first error detection signal ER1. Numeral 347 is a step that acts subsequently to the foregoing Step 346, and resets the first flag having been set in the mentioned Step 305 (FIG. 4). Numeral 348 is a step that acts when the determination in the mentioned Step 345 is NO (not more than 11), and carries out a standby for a predetermined time period. Then the program proceeds to mentioned operation end Step 317 subsequently to the mentioned Step 347, thus the mentioned operation start Step 300 operates in a circulating manner.

Numeral 350 is a step that acts when the determination in the mentioned Step 341 is NO (sum check error is absent), and determines whether or not data having been received normally from the sub station is data regarding the receiving failure (NACK) at the sub station. Numeral 351 is a step that acts when the determination in the foregoing Step 350 is YES (receiving failure), and sets a retransmission request flag. Numeral 352 is a step that acts subsequently to the foregoing Step 351, and adds 3 counts to a value of the operation means CN1 acting as the first adder-subtracter. Numeral 353 is a step that acts subsequently to the foregoing Step 352, and determines whether or not a current value of the operation means CN1 acting as the first adder-subtracter. When the determination in the foregoing Step 353 is YES (in excess of 11), the program proceeds to the mentioned Step 346.

Figure 7:
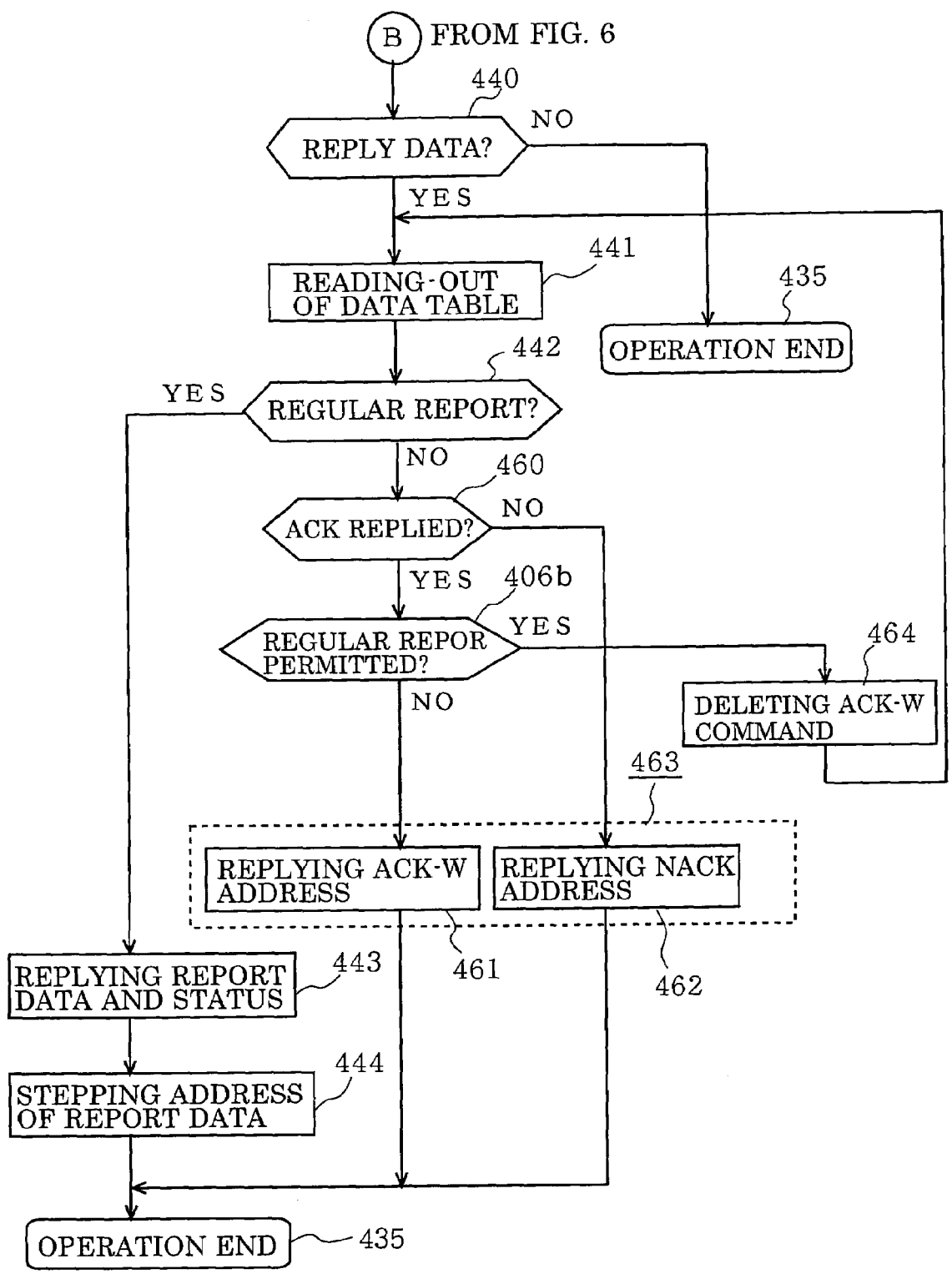
FIG. 7 is a flowchart for explaining a transmission operation at the second control circuit section of the electronic control unit according to the first embodiment.

Numeral 360 is a step that acts when the determination in the mentioned Step 350 is NO (it is not the receiving failure), and determines whether or not a received data is a regular report from the sub station by a regular report packet. Numeral 361 is a step that acts when the determination in the foregoing Step 360 is YES (regular report is received), and restarts a report interval timer T1. Numeral 362 is a step that acts subsequently to the foregoing Step 361, and subtracts 1 count from a value of the operation means CN1 acting as the first adder-subtracter. Numeral 374b is a step that acts subsequently to the foregoing Step 362, and deletes a leading regular transmission command in the reply-waiting data table 203a responsive to the fact that a regular report is normally received instead of the normal receiving confirmation reply ACK as the operation corresponding to the later-described Step 464 (FIG. 7). Numeral 365 is a step that acts subsequently to the foregoing Step 374b, and stores and saves a regular report data having been received. Numeral 366 is a step that acts when the determination in the mentioned Step 353 is NO (not more than 11) or subsequently to the mentioned Step 348 or Step 365 or the later-described Step 374a, and inverts a logic level of a transmission-permitting control signal. Then, the program proceeds to mentioned operation end Step 317 subsequently to the foregoing Step 366.

In addition, the mentioned Step 348 is to delay a logic inversion of a transmission-permitting control signal by Step 366 when Step 341 determines the presence of error. The second control circuit section 200b is capable of determining whether or not the first control circuit section 200a has normally received a communication packet by monitoring a logic inversion situation of the foregoing transmission-permitting control signal.

Numeral 370 is a step that acts when the determination in the mentioned Step 360 is NO (it is not the receiving of a regular report), and determines whether or not it is the receiving of a confirmation reply. When the determination in the foregoing Step 370 is NO (it is not a confirmation reply to the regular transmission), the program proceeds to the mentioned operation end step 317.

Numeral 373 is a step that acts when the determination in the mentioned Step 370 is YES (it is a confirmation reply of the normal receiving to the regular transmission), and subtracts 1 count from a value of the operation means CN1 acting as the first adder-subtracter. Numeral 374a is a step that acts subsequently to the foregoing Step 373, and erases a command, which is replied from the reply-waiting data table 203a, having been stored in the mentioned Step 339 (FIG. 4). Then the program proceeds to Step 366 subsequently to the foregoing Step 374a.

Describing the above-described operations in brief, with reference to FIG. 4, numeral 302 is first initialization means that sets a current value of the operation means CN1 acting as the first adder-subtracter to an initialization value 9. Numeral 310 is first communication error determination means acting as receiving interval monitoring means of the regular report. Numeral 315 is first error occurrence definition means for generating the first error detection signal ER1. Numeral 320 is first communication error determination means acting as reply delay monitoring means. Numeral 324 is first adder-subtracter consisting of Steps 313 and 321. Numeral 337a is retransmission means to the regular transmission. Numeral 2337a is regular transmission means.

With reference to FIG. 5, numeral 340 is first communication error determination means acting as bit information monitoring means. Numeral 346 is first error occurrence definition means for generating the first error detection signal ER1. Numeral 366 is transmission-permitting control signal generation means. Numeral 375 is first adder-subtracter consisting of Steps 344, 352, 362, and 373.

Figure 6:
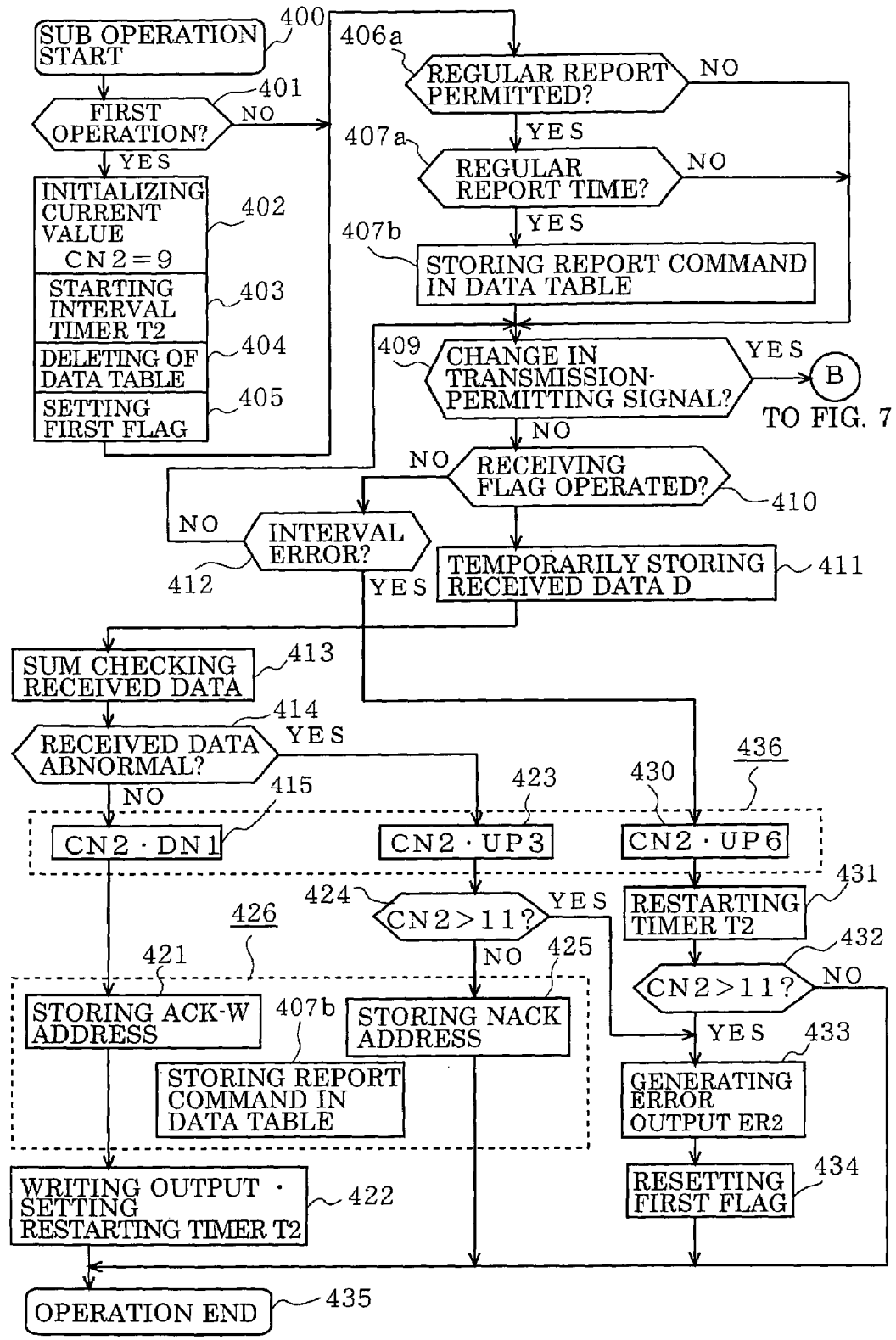
FIG. 6 is a flowchart for explaining a receiving operation at a second control circuit section of the electronic control unit according to the first embodiment.

Now, with reference to flowcharts of FIGS. 6 and 7, a communication control operation in the second control circuit section of the electronic control unit according to this first embodiment are described.

In this connection, FIG. 6 shows mainly an equivalent control flow as to a receiving operation of the communication control circuit section 120a in the second control circuit section 200b. FIG. 7 shows mainly an equivalent control flow as to a transmission operation of the communication control circuit section 120a in the second control circuit section 200b.

Referring to FIG. 6, numeral 400 is an operation start step of the communication control circuit section 120a that is regularly activated. The foregoing start step 400 is activated when the power supply switch 105b of FIG. 1 is turned on and when a reset pulse signal RST2 is supplied. The start step 300 operates in a circulating manner subsequently to the later-described operation end step 435.

Numeral 401 is a step that acts subsequently to the mentioned Step 400, and determines whether or not it is a first operation depending on whether or not a first flag is set in the later-described Step 405. Numeral 402 is a step that acts when the determination in the foregoing Step 401 is YES (it is the first operation), and sets a current value of the second adder-subtracter 208b to an initial value "9". Numeral 403 is a step that acts subsequently to the foregoing Step 402, and starts an interval timer T2 the interval of which corresponds to an upper limit value of a regular transmission cycle. Numeral 404 is a step that acts subsequently to the foregoing Step 403, and deletes a content of the unprocessed data table 203b of FIG. 2. Numeral 405 is a step that acts subsequently to the foregoing step 404, and sets the first flag, not shown. The mentioned first flag is reset when the power supply switch 105b, not shown, is turned on and when a reset pulse signal RST2 is supplied to the communication control circuit section 120a.

Numeral 406a is a step that acts when the determination in the mentioned Step 401 is NO (it is not the first operation) or subsequently to the mentioned Step 405, and determines whether or not the regular report is permitted as a result of receiving a regular transmission packet 211a of FIG. 3. Numeral 407a is a step that acts when the determination in the foregoing Step 406a is YES (regular report is permitted), and determines whether or not it is a regular report time received after a predetermined time period has passed since the last report. Numeral 407b is a step that acts when the determination in the foregoing Step 407a is YES (regular report time has come), and stores a regular report command in the unprocessed data table 203b of FIG. 2.

Numeral 409 is a step that acts when the determination in the mentioned Step 406a is NO (regular report is not permitted yet), when the determination in the mentioned Step 407a is NO (regular report time has not come yet), when the determination in the later-described Step 410 is NO (receiving flag is not operated yet) or subsequently to the later-described Step 407b, and determines whether or not a logic level of a transmission-permitting control signal 207a is inverted, and a transmission permission to the master station is given. When the determination in the foregoing Step 409 is YES (change in transmission-permitting signal is present), the program proceeds to Step 440 of FIG. 7.

Numeral 410 is a step that acts when the determination in the mentioned Step 409 is NO (transmission permission is absent), and determines whether or not a receiving flag is operated indicating the fact that the second series-parallel converter 127 receives a serial data having been transmitted from the first series-parallel converter 117 and that a parallel conversion completes.

Numeral 411 is a step that acts when the determination in the mentioned Step 410 is YES (receiving flag operates), and temporarily stores a series of received data having been received from the master station in a register D.

Numeral 412 is a step that acts when the determination in the mentioned Step 410 is NO (it is not received yet), determines whether or not the receiving interval monitoring timer T2 having been started in the mentioned Step 403 or the later-described Steps 422 and 431 is Time's Up. When the determination in the foregoing Step 412 is NO (it has not passed yet), the program returns to the mentioned Step 409.

Numeral 413 is a step that acts subsequently to the mentioned Step 411, and carries out a sum check of a series of received data having been received by the mentioned Step 411. Numeral 414 is a step that acts subsequently to the foregoing Step 413, and determines whether or not there is any error in the received data. Numeral 415 is a step that acts when the determination in the foregoing Step 414 is NO (normal), and subtracts 1 count from a value of operation means CN2 acting as a second adder-subtracter.

Numeral 421 is a step that acts subsequently to the mentioned Step 425, and temporarily stores an ACK•61H and the address, shown in the confirmation reply packet 201c of FIG. 3. Numeral 422 is a step that acts subsequently to the foregoing Step 421, and stores an output set data having been obtained in the mentioned Step 411 in a memory of a specified address, and restarts the receiving interval monitoring timer T2.

Numeral 423 is a step that acts when the determination in the mentioned Step 414 is YES (received data is abnormal), and adds 3 counts to a value of the operation means CN2 acting as the second adder-subtracter. Numeral 424 is a step that acts subsequently to the foregoing Step 423, and determines whether or not a current value of the operation means CN2 acting as the second adder-subtracter exceeds 11. Numeral 425 is a step that acts when the determination in the foregoing Step 424 is NO (not more than 11), and temporarily stores an NACK 62H and the address shown in the confirmation reply packet 211c of FIG. 3. The program proceeds to the mentioned operation end step 435 subsequently to the mentioned Steps 422 and 425.

Numeral 426 is a step block consisting of the mentioned Steps 407b, 421, 425. The foregoing step block is report reply command data that is stored in the unprocessed data table 203b of FIG. 2.

Numeral 430 is a step that acts when the determination in the mentioned Step 412 is YES (receiving interval of a regular transmission data is too large), and adds 6 counts to a value of the operation means CN2 acting as the second adder-subtracter. Numeral 431 is a step that acts subsequently to the foregoing Step 430, and restarts the receiving interval timer T2. Numeral 432 is a step that acts subsequently to the foregoing Step 431, and determines whether or not a current value of the operation means CN2 acting as the second adder-subtracter exceeds 11. Numeral 433 is a step that acts when the determination in the foregoing Step 432 is YES (in excess of 11) or when the determination in the mentioned Step 424 is YES (in excess of 11), and generates a pulse output of the second error detection signal ER2. Numeral 434 is a step that acts subsequently to the foregoing Step 433, and resets the first flag having been set in the mentioned Step 405. When the determination in the mentioned Step 432 is NO (not more than 11), or subsequently to the mentioned Step 434, the program proceeds to mentioned operation end step 435.

Referring now to FIG. 7, numeral 440 is a step that acts when the determination in mentioned Step 409 (FIG. 6) is YES (transmission permission is present), and determines whether or not there is any report reply command having been stored in the unprocessed data table 203b in the mentioned step block 426. Numeral 441 is a step that acts when the determination in the foregoing Step 440 is YES (report reply command is present), and reads out on the basis of first-in first-out a report reply command having stored in the mentioned unprocessed data table 203b.

Numeral 442 is a step that acts subsequently to the foregoing Step 441, and determines whether or not the command having been read out in Step 441 is a regular report command. Numeral 443 is a step that acts when the determination in the foregoing Step 442 is YES (it is a regular report command), and transmits a regular report packet 206a of FIG. 3. Numeral 444 is a step that acts subsequently to the foregoing Step 443, and steps an address at the next regular report.

Numeral 460 is a step that acts when the determination in the mentioned Step 442 is NO (it is not the regular report), and determines whether a report reply data having been read out in the mentioned Step 441 is a normal confirmation reply command (ACK) having been stored in mentioned Step 421 or a receiving failure confirmation reply command (NACK) having been stored in mentioned Step 425. Numeral 406b is a step that acts when the determination in the foregoing Step 460 is YES and it is determined to carry out an ACK reply. In this Step 496b, a regular transmission packet 211a of FIG. 3 is received to determine whether or not the regular report is permitted.

Numeral 461 is a step that acts when the determination in the mentioned Step 406b is NO and the regular report is not permitted yet, and replies an acknowledged data ACK and a corresponding address. Numeral 462 is a step that acts when the determination in the mentioned Step 460 is NO (NACK), and replies a non-acknowledged data NACK and a corresponding address. Numeral 464 is a step that acts when the determination in the mentioned Step 406b is YES that is the regular report is permitted, and deletes an acknowledged data ACK, which is a leading command in the unprocessed data table 203b and then returns to the mentioned Step 441. When the determination in the mentioned Step 440 is NO (reply data is absent), or subsequently to the mentioned Steps 444, 461 and 462, the program proceeds to mentioned operation end Step 435.

In addition, numeral 463 is a step block consisting of the mentioned Steps 461 and 462. The foregoing step block corresponds to the transmission of confirmation reply packets 201c, 211c, 221c of FIG. 3.

The above-described operations are described in brief. Referring to FIG. 6, numeral 402 is second initialization means that sets a current value of operation mans CN2 acting as a second adder-subtracter to an initialization value 9. Numeral 412 is second communication error determination means acting as receiving integral monitoring means of a regular transmission packet. Numeral 413 is second communication error determination means acting as bit information monitoring means for the data having been transmitted from the master station. Numeral 433 is second error occurrence definition means for generating the second error detection signal ER2. Numeral 436 is second adder-subtracter consisting of Steps 415, 423, 430.

Further, referring to FIG. 7, numeral 443 is regular report means for transmitting a regular report packet. Numeral 463 is confirmation reply means for transmitting a confirmation reply packet of the normal receiving or the receiving failure. However, when the regular report is permitted, Step 443 executes the regular report instead of a confirmation reply of the normal receiving in Step 461.

The action and operation are described in brief referring to FIGS. 1, 2, 3 on the basis of the foregoing descriptions of the flowcharts of FIGS. 4 to 7.

With reference to FIG. 1, the main CPU 110a takes an output from the first and second input sensor groups 102a an 102b and the first and second analog sensor groups 103a and 103b as an input signal, and controls the first and second electrical load groups 104a and 104b based on a control program or a control constant that is stored in the non-volatile program memory 115a. However, the mentioned second input sensor group 102b, the second analog sensor group 103b and the second electrical load group 104b perform a serial communication indirectly with the main CPU 110a via the first and second series-parallel converters 117 and 127.

In addition, although an analog output is not utilized in the first embodiment shown in FIG. 1, it is also possible to mount a DA converter for meter display as an indirect output, when required.

When the first error detection signal ER1 is generated in the first control circuit section 200a, the first flag is rest in Step 316 of FIG. 4 or in Step 347 of FIG. 5, and then the program proceeds to the operation end step 317. Therefore, when the program goes to the operation start Step 300 again, initialization of the first control circuit section 200a itself is carried out in Steps 302-305.

On the other hand, a reset pulse signal is inputted to a reset input terminal RST2 of the second control circuit section 200b by the first error detection signal ER1, whereby the second control circuit section 200b, being the other side, is initialized and restarted as well.

Likewise, when the second error detection signal ER2 is generated in the second control circuit section 200b, the first flag is rest in Step 434 of FIG. 6, and then the program proceeds to the operation end Step 435. Therefore, when the program goes to the operation start Step 400 again, initialization of the second control circuit section 200b itself is carried out in Steps 402-405.

On the other hand, a reset pulse signal is inputted to a reset input terminal RST1 of the main CPU 110a in the first control circuit section 200a by the second error detection signal ER2, whereby the first control circuit section 200a, being the other side, is also initialized and restarted as well.

The first and second control circuit sections 200a and 200b are initialized and restarted also by a reset pulse signal RST1 from the watchdog timer 130. Upon, however, generation of the first and second error detection signals ER1 and ER2 or a reset pulse signal RST1 provided by the watchdog timer 130, the error storage circuit 131a stores this signal generation to bring the alarm and display 108 in operation, as well as stops the operation of the load power supply relay 107a so that a power feed to a part of specific electrical loads is stopped.

Accordingly, in the case where the main CPU 110a temporarily malfunctions due to noise malfunction, a reset pulse RST1 automatically restarts the main CPU. However, a drive stop state of a part of the electrical loads due to the operation stop of the load power supply relay 107a continues.

Nevertheless, when the power supply switch 105b is turned on again, the error storage of the error storage circuit 131a is cleared, thereby enabling to recover to the normal operation state.

With reference to FIGS. 2 and 3, a basic transmit-receive communication packet in this first embodiment is constituted of an output setting by the regular transmission means 201a from the master station to the sub station, and the input readout by the regular report means 206a from the sub station to the master station.

However, to prevent an erroneous output setting, replying a communication packet executed by the normal receiving confirmation reply means 201c or the receiving failure confirmation reply means 211c from the sub station to the master station is carried out for the transmission from the master station to the sub station.

In addition, supposing that there is only a reciprocating communication in which a master station transmits and the sub station replies to this transmission, the master station waits for the reply from the sub station and then carries out the next transmission, thereby enabling to avoid jam-up of communication.

However, supposing that the sub station side intends to transmit a regular report to the master station without any command from the master station, the jam-up will occur in an upstream communication.

The unprocessed data table 203b is to make a queue of un-replied information, and sequentially replies the information when occurring such jam-up, thereby enabling to execute the regular transmission or the regular report on a timely basis.

Furthermore, it is arranged such that the regular report from the sub station is inhibited at the time of operation start when there is a large amount of data of downstream communication; and the main CPU 110a can transmit an initial set data in a concentrated manner.

As has been obvious from the above description, the electronic control unit 100a according to the first embodiment includes: a first control circuit section 200a that is provided with a program memory 115a including input/output control means and communication control means, an operation processing RAM memory 116a, a microprocessor 110a cooperating with mentioned program memory 115a, and a first series-parallel converter 117; and a second control circuit section 200b includes at least a communication control circuit section 120a for performing communication of a monitoring and control signal, a data memory 126a, and a second series-parallel converter 127. The first control circuit section 200a and second control circuit section 200b mutually carries out a serial communication of a monitoring and control signal via the mentioned first and second series-parallel converters. The mentioned first control circuit section 200a further includes regular transmission means 201a and transmission-permitting control signal generation means 207a, and the mentioned second control circuit section 200b further includes confirmation reply means 201c, regular report means 206a, and an unprocessed data table 203b.

The mentioned regular transmission means 201a is write setting means for regularly transmitting a control output data or a constant set data from the mentioned first control circuit section 200a to the mentioned second control circuit section 200b, and for storing an output and set data having been normally received at the mentioned second control circuit section 200b in the mentioned data memory 126a.

The mentioned confirmation reply means 201c is communication means for executing a confirmation reply of whether the mentioned second control circuit section 200b has normally received or failed to receive the mentioned regular transmission data, and for requesting a retransmission processing from the first control circuit section 200a to the second control circuit section 200b in case of any receiving failure.

The mentioned regular report means 206a is input readout means for regularly reporting a monitoring input data and status information from the mentioned second control circuit section 200b to the mentioned first control circuit section 200a, and for storing the mentioned regular report data that the mentioned first control circuit section has normally received, in the mentioned RAM memory 116a.

The mentioned unprocessed data table 203b acts as a receiving-side command memory of a first-in first-out structure that is provided in the mentioned second control circuit section 200b, and arranged so as to sequentially save a command data for executing the mentioned regular report and a command data for executing a confirmation reply, and to sequentially erase the mentioned saved command data when transmitting a regular report and confirmation reply data to the mentioned first control circuit section 200a.

The mentioned transmission-permitting control signal generation means 207a is control signal transmission means from the mentioned first control circuit section 200a to the mentioned second control circuit section 200b, by which the second control circuit section 200b having received this signal starts to execute the transmission of the most first-in leading command in the mentioned unprocessed data table 203b, and adds the latest monitoring input data and status information thereto and transmits a resulting command in the case where this leading command is a regular report. The mentioned unprocessed data table 203b carries out a transmission standby as a measure for delay in signal generation from the mentioned transmission-premitting control signal generation means 207a or congestion in confirmation reply and regular report to prevent a communication jam-up.

As a result, it is possible for the second control circuit section to execute the regular report at one's own initiative even if there is no request from the first control circuit section. However, this regular reporting is carried out based on a transmission-permitting control signal that the first control circuit section generates, thereby enabling to diminish a communication control burden on the first control circuit section.

Further, in the case where the generation of a transmission-permitting control signal is delayed due to congestive situation on the first control circuit section side, or the confirmation reply and the regular report take place substantially at the same time, a transmission standby is carried out with the unprocessed data table to be capable of preventing the communication jam-up. Consequently, it is possible to further diminish a communication control burden on the first control circuit section.

Furthermore, it is possible to transmit the latest information at the moment of transmission of the regular report to the first control circuit section.

In the above-described electronic control unit 100a according to the first embodiment, the mentioned transmission-permitting control signal generation means 207a generates a control signal, a logic level of which inverts alternately every time the mentioned first control circuit section receives a regular report or confirmation reply data from the mentioned second control circuit section 200b.

As a result, an advantage exists in that the second control circuit section 200b can detect a receiving state on the other side by monitoring the presence or absence of any change in logic level of a transmission-permitting control signal 207a after a predetermined time period has passed since the transmission thereof to the first control circuit section 200a.

In the electronic control unit 100a according to the first embodiment, the mentioned first control circuit section 200a further includes regular report permission means 211a. This regular report permission means 211a is means for storing a command data that is transmitted by the mentioned regular transmission means 201a to a predetermined address of memory provided in the mentioned second control circuit section 200b, and acts to permit the second control circuit section 200b to transmit the mentioned regular report; and a normal confirmation reply 201c responsive to the mentioned regular transmission is replaced with the transmission of a regular report 206a when the regular report is permitted.

As a result, an advantage exists in that a communication control burden on the master station side can be diminished by setting the regular report not to be permitted when there are much downstream communication of various set information from the first control circuit section 200a acting as the master station to the second control circuit section 200b acting as the sub station at the start of operation; and that the normal confirmation reply 201c from the sub station is omitted under the state of normal operation, thereby likewise enabling to diminish a communication control burden on the master station side.

In the electronic control unit 100a according to the first embodiment, the mentioned first control circuit section 200a further includes first communication error determination means 310, 320, 340, first adder-subtracter 324, 375, and first error occurrence definition means 315, 346; and the mentioned second control circuit section 200b further includes second communication error determination means 412, 413, second adder-subtracter 435, and second error occurrence definition means 433.

The mentioned first and second communication error determination means act as receiving error determination means for determining the presence or absence of any error as to various communication packets received by the control circuit section, on the side where this determination means is provided, from the other control circuit section or determining a state of being incapable of receiving a communication packet to be received.

The mentioned first and second adder-subtracters act as operation means that adds a second variation value "3" when the mentioned receiving error determination means determines the presence of error, and subtracts a first variation value "1" when the receiving error determination means determines the absence of error to perform an addition-subtraction compensation with respect to a current value memory so as to counteract each other, and stops the addition-subtraction compensation with the mentioned first variation value at a current value "0", being a predetermined normal-side limit value, when the determination of the absence of error still continues.

The mentioned first and second error occurrence definition means act as comparison means for generating error detection signals ER1 and ER2 when a current value of the mentioned adder-subtracter exceeds a predetermined abnormal-side limit value "11" resulted from accumulation of the mentioned first and second variation values; and the mentioned second variation value "3" is set to a value smaller than a permitted accumulation value, being a difference between the mentioned abnormal-side limit value "11" and normal-side limit value "0", and initialization and restart of the mentioned first or second control circuit section is carried out responsive to the generation of mentioned error detection signals ER1 and ER2.

As a result, there is an advantage that any too sensitive error determination is not carried out with respect to a sporadic and chronic error. In addition, in the case where a communication error still occurs even if the retransmission processing continues, an error determination is performed base on the fact that a current value of the first adder-subtracter exceeds an abnormal-side limit value, and the initialization and restart are carried out. Consequently, an advantage exists in that permitted number of times of retransmission processing can be rationally regulated depending on the past history of whether or not a normal communication has continued.

In the electronic control unit 100a according to the first embodiment, the mentioned first control circuit section 200a further includes first initialization means 302, and the mentioned second control circuit section 200b further includes second initialization means 402.

The mentioned first initialization means 302 operates when the mentioned first error occurrence definition means 315 and 346 generate an error detection signal ER1, resets a current value of the mentioned first adder-subtracter to a predetermined initialization value "9" set at the start of operation, and initializes and restarts a communication control circuit section 120a provided in the mentioned second control circuit section 200b.

The mentioned second initialization means 402 operates when the mentioned second error occurrence definition means 433 generates an error detection signal ER2, resets a current value of the mentioned second adder-subtracter to a predetermined initialization value "9" set at the start of operation, and initializes and restarts a microprocessor 110a provided in the mentioned first control circuit section 200a.

The initialization value "9" of the first and second adder-subtracters to be reset by the mentioned first and second initialization means is a value close to the mentioned abnormal-side limit value "11" apart from the mentioned normal-side limit value "0".

As a result, an advantage exists in that a control circuit section on the other side can be initialized without depending on a communication line where an error occurs; and that a current value of the adder-subtracter is made close to an abnormal-side limit value at the time of restart, thereby enabling to improve safety shortly after the start-up.

In the electronic control unit 100a according to the first embodiment, the mentioned first communication error determination means further includes bit information monitoring means 340, reply delay monitoring means 320, and receiving interval monitoring means 310; and second communication error determination means further includes bit information monitoring means 413 and receiving interval monitoring means 412.

The mentioned bit information monitoring means 340 and 413 act as bit error determination means for determining the presence or absence of any lack or mix in bit information such as parity check or sum check relative to a serial data communicated between the mentioned first and second control circuit sections.

The mentioned reply delay monitoring means 302 acts as reply response error determination means for making an error determination at the first control circuit section 200a, being a source side, when a reply data from the mentioned second control circuit section 200b relative to a data, which the mentioned first control circuit section 200a has transmitted, cannot be received even when a predetermined reply response time period has passed.

The mentioned receiving interval monitoring means 310 and 412 act as receiving interval error determination means for making an error determination when a receiving interval time period of the other-side control circuit section with respect to a regular transmission data that the mentioned first control circuit section 200a transmits or a regular report data that the mentioned second control circuit section 200b transmits exceeds a predetermined value. The mentioned adder-subtracter performs a subtraction compensation with a first variation value "1" when none of the mentioned bit information monitoring means, reply delay monitoring means, and receiving interval monitoring means determines any error.

As a result, an advantage exists in that a variety of determinations on communication error enable improvement in detection accuracy and an early detection of a communication error; and that a highly accurate error determination can be carried out due to the fact that definition of an error occurrence is carried out with data collected at a pair of adder-subtracters.

In the electronic control unit 100a according to the first embodiment, the mentioned second variation value "3", which the mentioned adder-subtracter adds or subtracts when the determination of the mentioned bit information monitoring means 340 and 413 is a communication error, is established to be a value larger than mentioned first variation value "1"; and a variation value, which the mentioned adder-subtracter adds or subtracts when the determination of the mentioned reply delay monitoring means or receiving interval monitoring means 310 and 412 is a communication error, is established to be a third variation value "6", being a value different from mentioned second variation value "3"; and the mentioned third variation value is established to be a value smaller than a permitted accumulation value "11", being a difference between the mentioned abnormal-side limit value "11" and normal-side limit value "0".

As a result, it is possible to make an error determination with weighting a variety of determinations of communication error; and it is unnecessary to set an excessive float for a determination threshold value of a timeout error such as reply delay or over-receiving interval, and it is possible to set a determination time period appropriate for raw capability. Consequently, there is an advantage that a highly accurate timeout determination can be made.

Furthermore, in the electronic control unit 100a according to the first embodiment, the mentioned first control circuit section 200a further includes direct input/output signal interface circuits 112a and 114a, and the mentioned second control circuit section 200b further includes a watchdog timer 130 and error occurrence storage means 131a.

The mentioned direct input/output signal interface circuits 112a and 114a are bus-connected to the mentioned microprocessor 110a. This microprocessor 110a is arranged so as to generate an output signal in response to a direct input signal having been inputted via the mentioned direct input signal interface circuit 112a, an indirect input signal having been received by a serial communication from a second series-parallel converter 127 provided in the mentioned second control circuit section 200b, and a content of the mentioned program memory 115a to drive a first electrical load group 104a, which is connected to the mentioned direct output signal interface circuit 114a. Further, the microprocessor 110a transmits an indirect output signal via the mentioned first and second series-parallel converters 117 and 127 to the second control circuit section 200b.

The mentioned watchdog timer 130 acts as a run-away monitoring timer circuit that monitors a watchdog clear signal WD1, being a pulse train, generated by the mentioned microprocessor 110a, and generates a reset pulse signal RST1 when a pulse width of this watchdog clear signal exceeds a predetermined value.

The mentioned error occurrence storage means acts as an error storage circuit that stores the mentioned first and second error detection signals ER1 and ER2 or a reset pulse signal RST1 to bring annunciation means 108 such as alarm, display, printing, history save in operation when any of such error detection signals is generated and when this reset pulse signal provided by the mentioned watchdog timer is generated.

The mentioned microprocessor 110a is initialized and restarted when the mentioned watchdog timer 130 generates a reset pulse signal RST1 and when the mentioned second error detection signal ER2 is generated, and a communication control circuit section 120a of the mentioned second control circuit section 200b is initialized and restarted when the mentioned watchdog timer 130 generates a reset pulse signal RST1 and when the mentioned first error detection signal ER1 is generated.

As a result, there is an advantage such that it is possible to restart the microprocessor 110a without depending on a communication line where any error occurs. Further, while an error detection signal regarding communication is generated responsive to plural times of communication errors, the occurrence of a watchdog timer error immediately causes the error storage or the restart, thereby leading to an advantage that it is possible to change the weighting on the error processing to announce the error.

A further advantage exists in that even in the case where the error is a temporary noise malfunction of the microprocessor 110a and the microprocessor 110a is immediately restarted in a normal way, the fact that the error occurs is well indicated, thereby enabling to induce a maintenance inspection.

In the electronic control unit 100a according to the first embodiment, the mentioned second control circuit section further includes driving stop means 132a and clear means. This driving stop means 132a acts as a gate circuit that operates when the mentioned error occurrence storage means 131a stores an error occurrence to inhibit driving specified electrical loads, being a part of the mentioned electrical load group. The mentioned clear means acts as means for initializing an error storage signal provided by the mentioned error occurrence storage means 131a by manual operation such as turning on a power supply switch 105b again.

As a result, an advantage exists in that even in the case where an error is a temporary noise malfunction, and the electronic control unit is immediately restarted in a normal way, driving the specified electrical loads having an affect on safety is stopped, thereby improving safety; and that it is possible to cause the electronic control unit to return to a normal operation state by manual operation.

Embodiment 2

Figure 8:
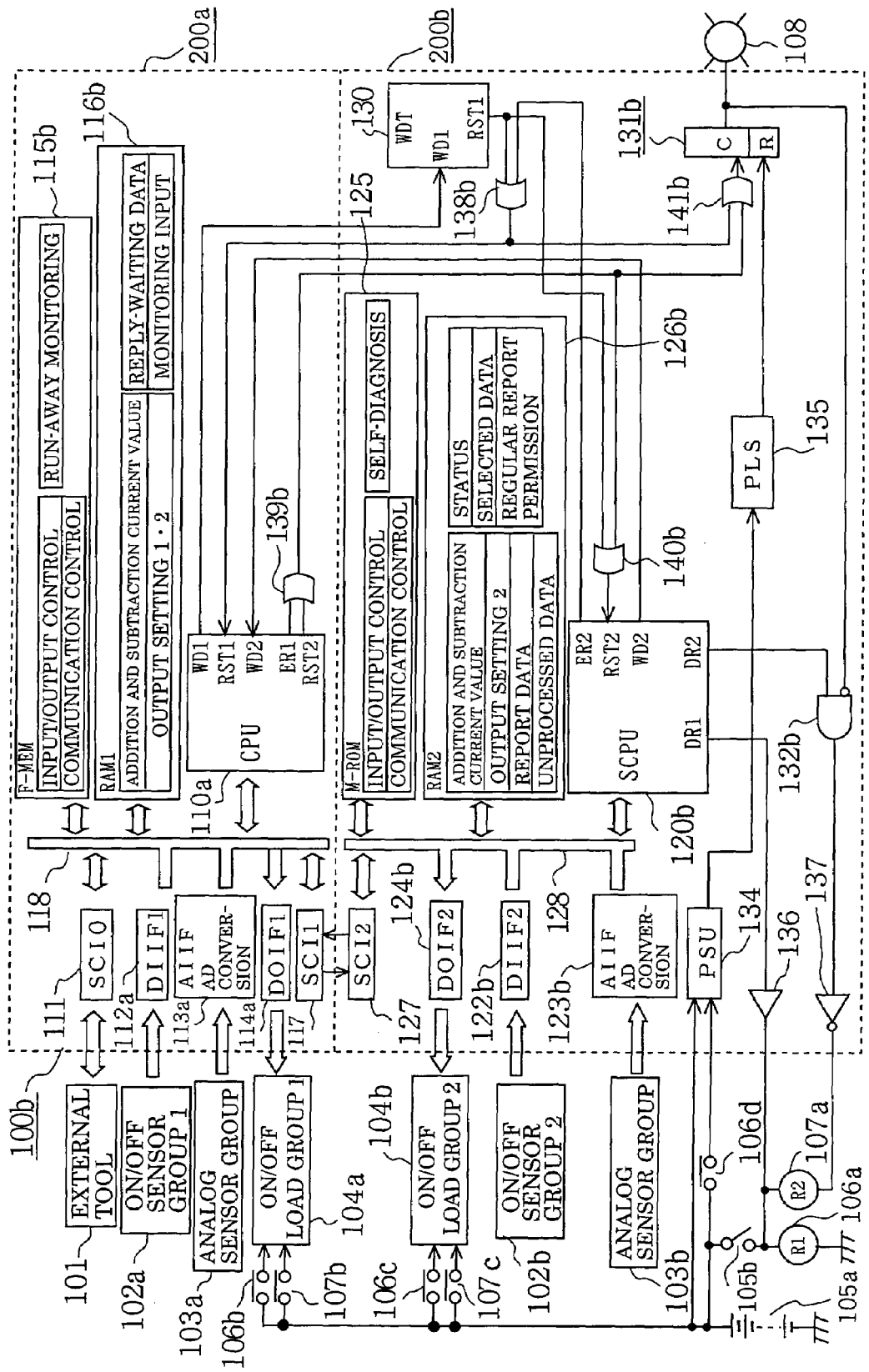
FIG. 8 is a block diagram showing an entire constitution of an electronic control unit according to a second embodiment.

FIG. 8 is a block diagram showing an entire constitution of an electronic control unit according to a second preferred embodiment of the invention.

In the electronic control unit according to the foregoing first embodiment, the communication control circuit section 120a is constituted of an integrated circuit element employing a logical circuit. Whereas, the electronic control unit according to this second embodiment differs from that of the first embodiment mainly in the aspects that an auxiliary CPU 120b is provided to act as a communication control circuit section, and that irregular transmission means is added to the first control circuit section.

Hereinafter, the electronic control unit according to the second embodiment is described focusing on points different from the electronic control unit according to the foregoing first embodiment shown in FIG. 1.

Now referring to FIG. 8, numeral 100b designates an electronic control unit consisting of a first control circuit section 210a and a second control circuit section 210b. Numeral 110b designates a microprocessor acting as a main CPU. Numeral 115b designates a non-volatile program memory such as flash memory cooperating with the foregoing main CPU. Written in the mentioned program memory 115b are a program acting as input/output control means, a program acting as communication control means, a program acting as run-away monitoring means with respect to the later-described auxiliary CPU 120b, etc.

Numeral 116b designates a RAM memory for operation processing. Written in this RAM memory are a current value data of the later-described first adder-subtracter, an output set data with respect to the mentioned first and second electrical load group 104a and 104b, the later-described reply-waiting command data, a monitoring input data such as indirect input information or status information having been reported from the mentioned second control circuit section 210b, etc.

Numeral 120b designates a microprocessor acting as an auxiliary CPU. Numeral 125 designates an auxiliary program memory cooperating with the foregoing auxiliary CPU. Stored in the foregoing auxiliary program memory 125 are a program acting as input/output control means in the second control circuit section 210b, a self-diagnosis program, a communication control program, etc.

Numeral 126b designates an auxiliary RAM memory. Written in this auxiliary RAM memory 126b are a current value data of the later-described second adder-subtracter, an output set data with respect to the second electrical load group 104b or a regular report permission signal having been transferred from the mentioned main CPU 110b, the later-described unprocessed command data, a report data, status information, a selected data, and the like to be transmitted to the main CPU 110b.

Furthermore, the mentioned main CPU 110b monitors a pulse width of a watchdog clear signal WD2 generated by the auxiliary CPU 120b, and generates a reset pulse signal RST2 when the foregoing pulse width exceeds a predetermined value.

Numeral 131b designates a count storage circuit including a count input, a reset input and a count up output. Numeral 138b designates an OR element with respect to a reset pulse signal RST1 that the mentioned watchdog timer 130 generates and the second error detection signal ER2 that the mentioned auxiliary CPU 120b generates. The main CPU 110b is reset and restarted by an output from the mentioned OR element.

Numeral 139b designates an OR element with respect to the first error detection signal ER1 and the reset pulse signal RST2 that the mentioned main CPU generates. Numeral 140b designates an OR element with respect to the reset pulse signal RST1 generated by the mentioned watchdog timer 130 and an output from the mentioned OR element 139b. The mentioned auxiliary CPU 120b is reset and restarted in response to an output from the mentioned OR element.

Numeral 141b designates an OR element with outputs from the mentioned OR elements 138b and 139b being inputted thereto. An output terminal of the mentioned OR element is connected to a count input terminal of the mentioned count storage circuit 131b.

In addition, the mentioned count storage circuit 131b counts and stores number of operations of the mentioned reset pulse signals RST1 and RST2 or the first and second error detection signals ER1 and ER2. Further, the mentioned count storage circuit 131b drives the mentioned alarm and display 108 when the foregoing count value is not less than a predetermined value; and a count storage value is reset by the power supply detection circuit 135 when the mentioned power supply switch 105b is closed.

Numeral 132b designates drive stop means acting as a gate element. Numeral 137 designates an inversion drive element that drives a load power supply relay 107a via the mentioned drive stop means 132b in response to a drive output DR2 that the auxiliary microprocessor 120b generates. The foregoing load power supply relay 107b operates when the drive output DR2 is generated when the count storage circuit 131b does not count up.

In addition, the mentioned auxiliary CPU 120b generates a drive output DR1 to hold the operation of a power supply relay 106a, and generates the second error detection signal ER2 or a watchdog clear signal WD2.

Figure 9:
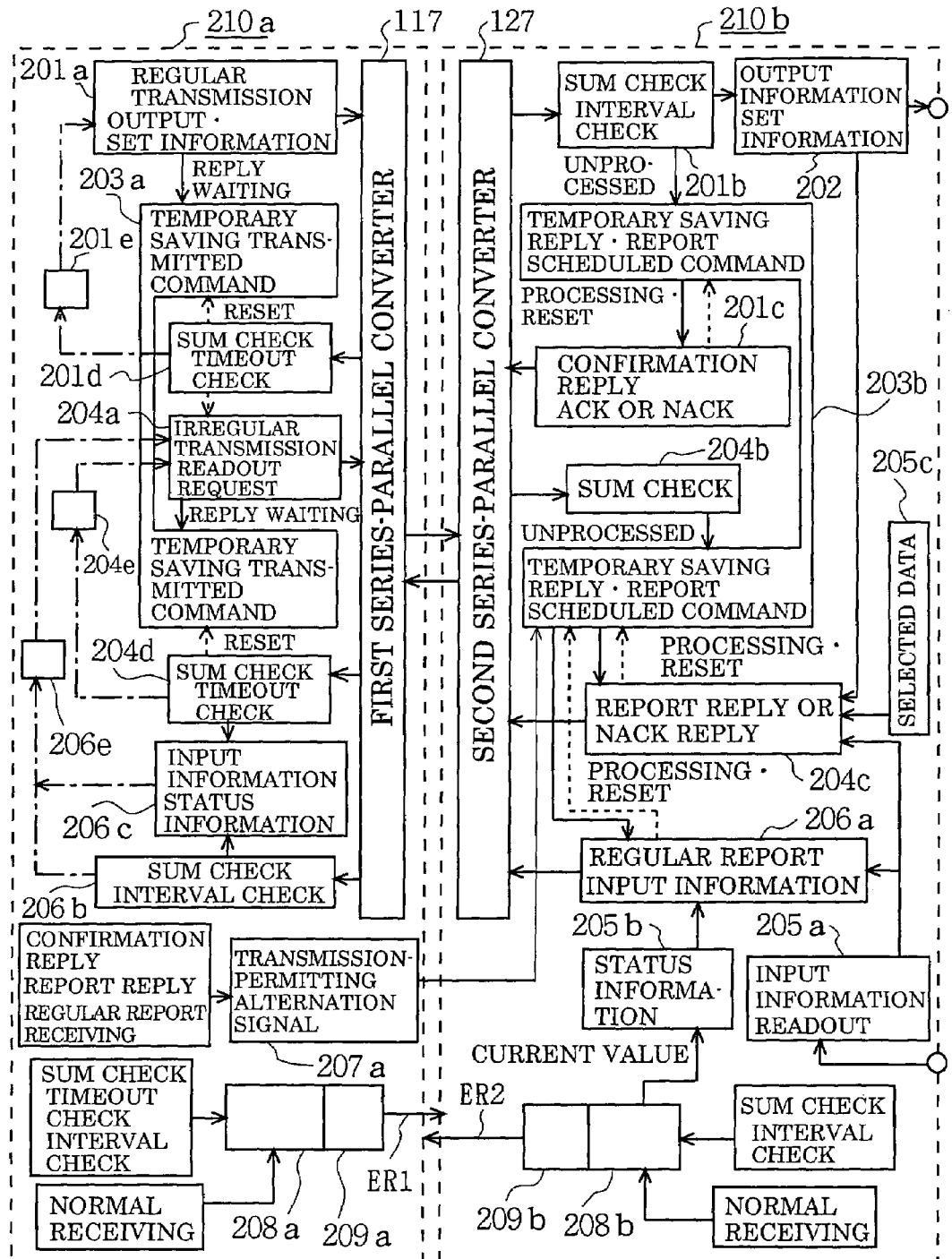
FIG. 9 is a block diagram for explaining a communication control operation of the electronic control unit according to the second embodiment.

FIG. 9 is a block diagram for explaining a communication control operation of the electronic control unit shown in FIG. 8. With reference to FIG. 9, a communication control block of the electronic control unit according to this second embodiment is described, focusing on points different from the above-described electronic control unit according to the foregoing first embodiment.

Referring to FIG. 9, numeral 204a designates irregular transmission means by which an irregular transmission is carried out from the master station to the sub station when the master station makes a readout request with respect to the sub station. Numeral 204b designates second communication error determination means that is performed on the sub station having received a communication packet provided by the foregoing irregular transmission means. In the mentioned unprocessed data table 203b, the receiving failure as a determination result of the mentioned determination means 204b, or an address of reply information necessary to be reported and replied is stored along with a replying command.

Numeral 205a designates a block for reading out input information on the sub station side. Numeral 204c designates report reply means by which a report is replied from the sub station to the master station. The foregoing report reply means corresponds to a leading reply command data having been stored at the earliest time and remained in the mentioned unprocessed data table 203b. Further a leading reply command data in the mentioned unprocessed data table 203b is deleted accompanied with the transmission of a communication packet by the report reply means 204c.

In addition, in the mentioned unprocessed data table 203b, a replying command data corresponding to the mentioned regular transmission packet 201a, a replying command data corresponding to the mentioned irregular transmission packet 204a, and a regular reporting command data corresponding to the mentioned regular report packet 206a, are synthesized to be stored in order of generation. Then, these data are replied sequentially in such a manner that the older ones are fetched out first on the basis of first-in first-out.

Likewise, when the mentioned regular transmission packet 201a or irregular transmission packet 204a are transmitted, transmission command data are sequentially stored in the mentioned reply-waiting data table 203a.

Numeral 204d designates first communication error determination means performed on the master station side having received a reply data from the sub station. Numeral 204e designates retransmission request means. When the mentioned determination means 204d determines the normal receiving, a leading command data, which is stored in the mentioned reply-waiting data table 203a is deleted; and input information relative to an address, which is specified with the mentioned report reply packet 204c, is stored and saved by the later-described input information storage means 206c.

In addition, when the mentioned determination block 204d normally receives a receiving failure data NACK of the sub station side, or when the determination block 204d makes the determination of the receiving error relative to any reply data, a retransmission processing is carried out with an irregular transmission packet 204a by the mentioned retransmission request means 204e. Upon this retransmission processing, an old save data in the mentioned reply-waiting data table 203a is deleted, and a transmission command data having been retransmitted is stored anew.

Numeral 206e designates readout request means that acts when a readout request flag is included in status information having been regularly reported. The irregular transmission means 204e, which operates based on the mentioned readout request means 206e, is capable of reading out a selected data such as self-diagnosis information in the second control circuit section 210b by addressing a specified address in which a selected data 205c is stored.

Furthermore, even when the mentioned determination means 206b determines a receiving error, it is possible to execute the readout confirmation by the mentioned readout request means 206e. Actually, however, when the receiving error still continues after having waited for the next regular report, it is arranged to carry out the readout confirmation.

Figure 10:
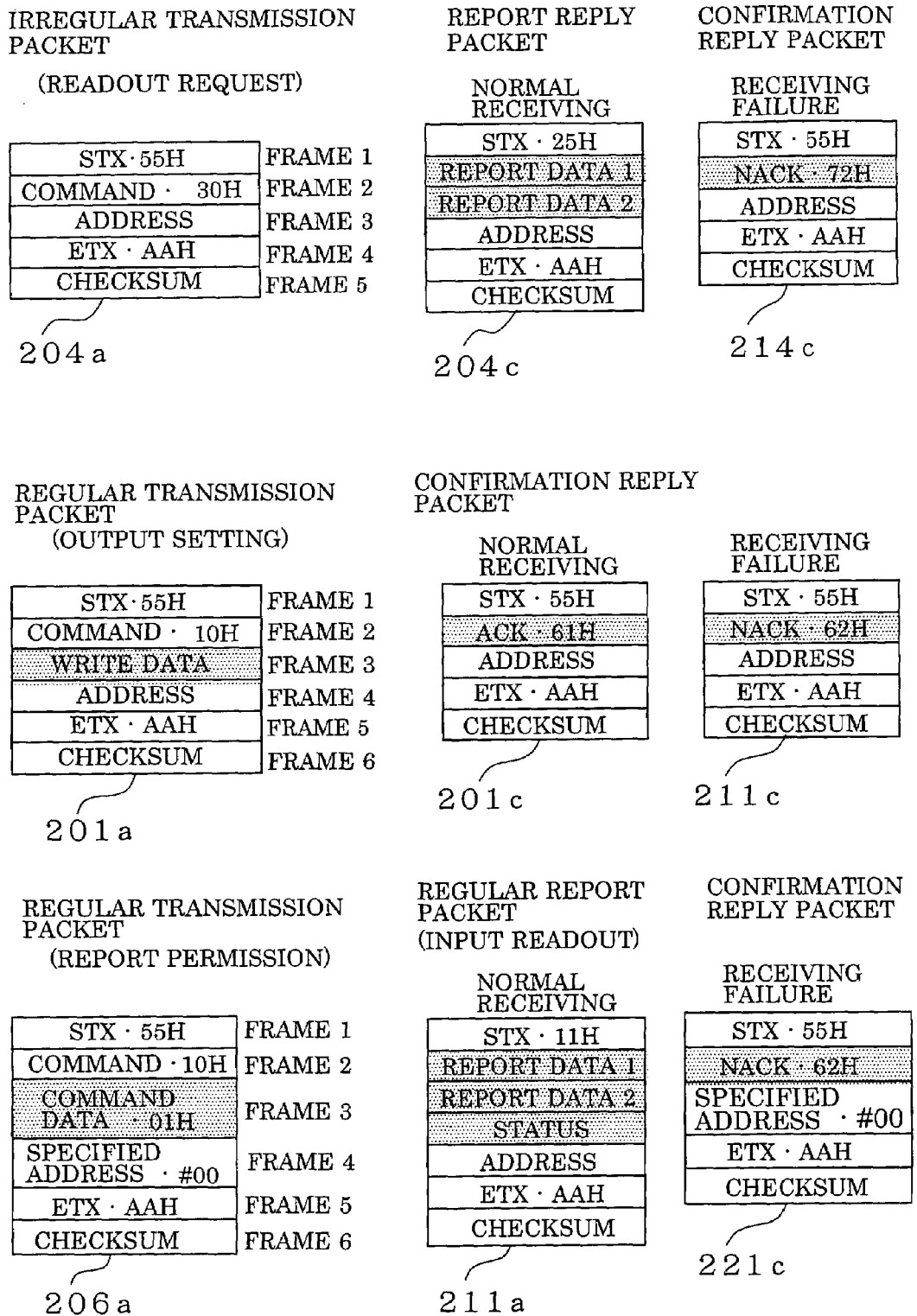
FIG. 10 is a diagram showing several constitutions of communication packet in the electronic control unit according to the second embodiment.

FIG. 10 shows a block diagram of a packet of a serial communication in the electronic control unit according to the second embodiment shown in FIG. 8. An irregular transmission packet added to the electronic control unit according to the first embodiment shown in FIG. 1 is hereinafter described.

Referring to FIG. 10, numeral 204a is communication packet acting as irregular transmission means in the case of making the readout request (readout from the sub station to the master station) for various data from the master station to the sub station. Upon the readout request, first an irregular transmission packet 204a from the master station to the sub station is transmitted, and an address intended to read out is specified.

In addition, the mentioned irregular transmission packet 204a consists of 5 frames of a start data 55H, a command 30H, a readout location address, and end data AAH, and a checksum data.

Numeral 204c designates a communication packet acting as report reply means which communication packet is replied to the master station at the time of normal receiving. This report reply packet consists of 6 frames of a start data 25H, a readout data 1, a readout data 2, a readout location address, an end data AAH, and a checksum data.

Further, the mentioned readout location address is a storage location address of a readout data 1. In the case where readout data is 8 bits of data, the readout data 2 is a data having an older number address following the readout data 1.

Furthermore, in the case where readout data of the readout location address is 16 bits of data, the readout data 1 is a data of upper 8 bits, and the readout data 2 is a data of lower 8 bits.

Numeral 214c designates a communication packet acting as confirmation reply means which communication packet is replied to the master station at the time of abnormal receiving. This confirmation reply packet consists of 5 frames of a start data 55H, a non-acknowledged data 72H, a readout location address, an end data AAH, and a checksum data.

Figure 11:
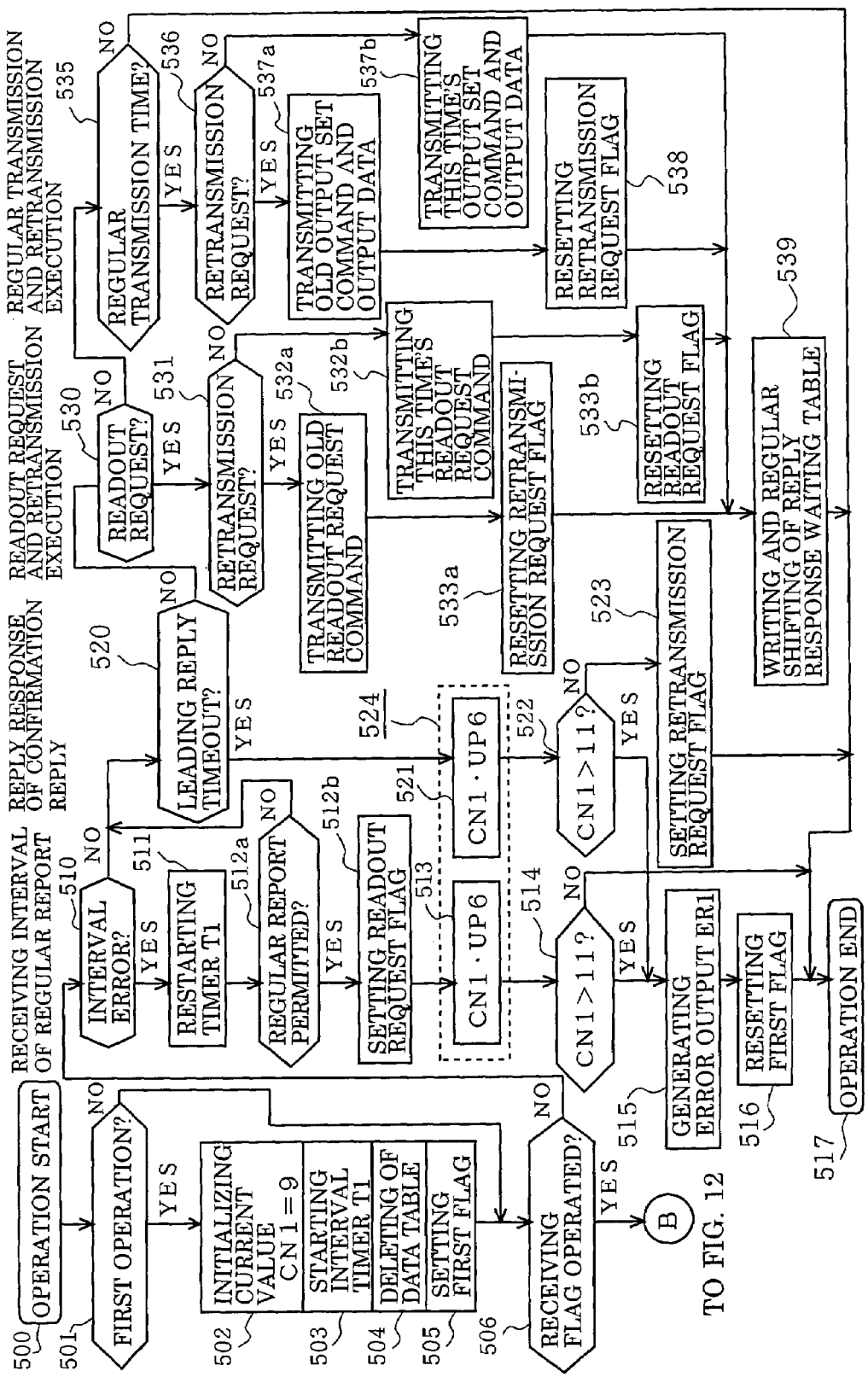
FIG. 11 is a flowchart for explaining a transmission operation at a first control circuit section of the electronic control unit according to the second embodiment.
Figure 12:
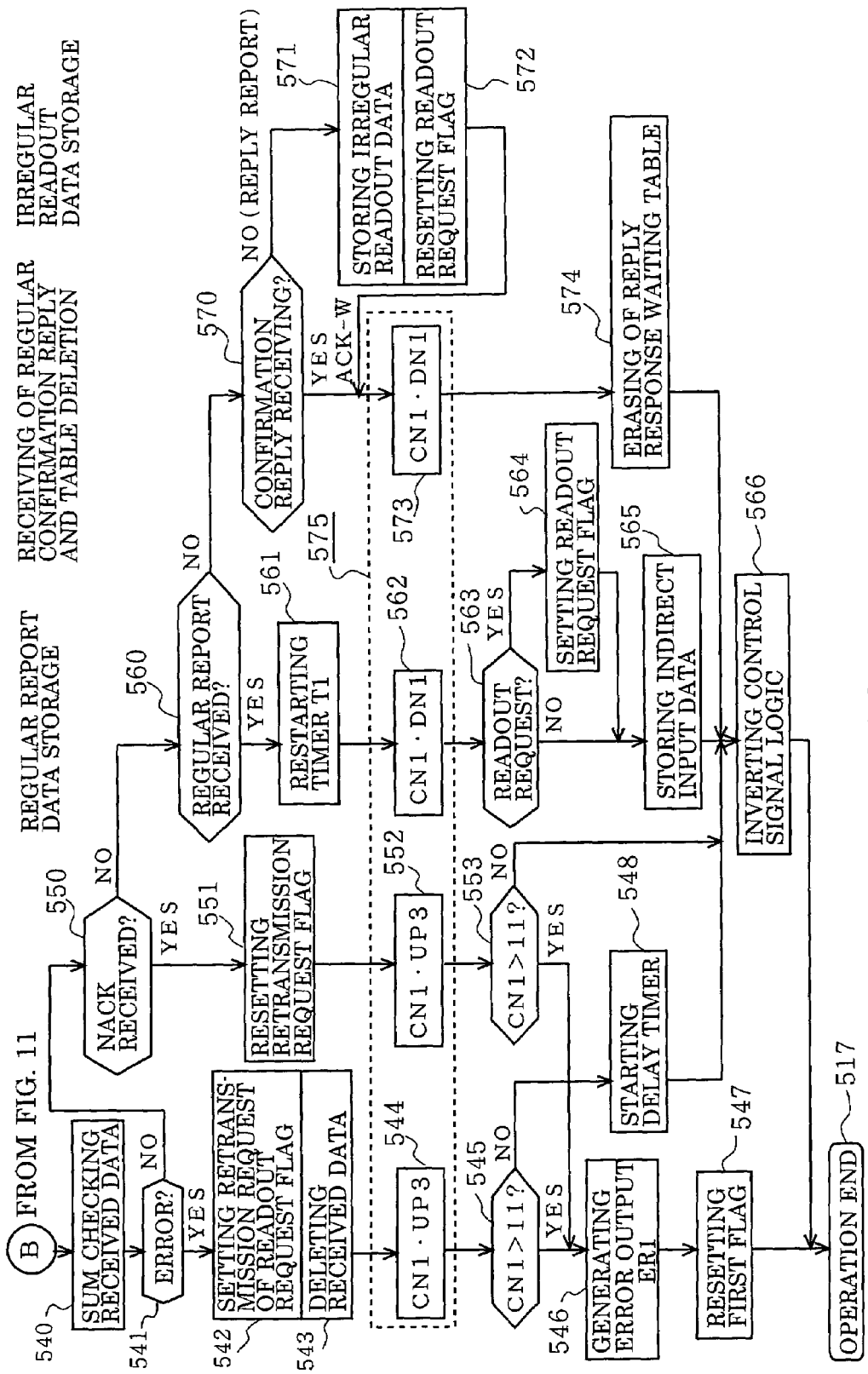
FIG. 12 is a flowchart for explaining a receiving operation at the first control circuit section of the electronic control unit according to the second embodiment.

Now, a communication control operation in the first control circuit section of the electronic control unit according to this second embodiment is described based on a flowchart referring to FIGS. 11 and 12.

In addition, FIG. 11 shows mainly a flow of a transmission operation in the first control circuit section 210a. FIG. 12 shows mainly a flow of a receiving operation in the first control circuit section 210a.

Referring now to FIG. 11, numeral 500 is an operation-start step of the main CPU 110b that is regularly activated. This start step is activated when the power-supply switch 105b of FIG. 8 is turned on and when a reset pulse signal RST1 is supplied to the main CPU 110b. The operation start Step 500 operates in a circulating manner subsequently to the later-described operation end step 517.

Numeral 501 is a step that acts subsequently to the mentioned Step 500, and determines whether or not it is a first operation depending on whether or not a first flag is set in the later-described Step 505. Numeral 502 is a step that acts when the determination in the foregoing Step 501 is YES (it is the first operation), and sets a current value of the first adder-subtracter 208a to an initial value "9". Numeral 503 is a step that acts subsequently to the mentioned Step 502, and starts up an interval timer T1 the interval of which corresponds to an upper limit value of a regular report cycle. Numeral 504 is a step that acts subsequently to the foregoing Step 503, and deletes a content of the reply-waiting data table 203a of FIG. 9. Numeral 505 is a step that acts subsequently to the foregoing Step 504, and sets the first flag not shown. The mentioned first flag is reset when the power supply switch 105b of FIG. 8 is turned on and when a reset pulse signal RST1 is supplied to the main CPU 110b.

Numeral 506 is a step that acts when the determination in the mentioned Step 501 is NO (it is not the first operation) or subsequently to the mentioned Step 505, and determines whether or not a receiving flag indicating that the first series-parallel converter 117 receives a serial data having been transmitted from the second series-parallel converter 127 and that a parallel conversion completes, is operated. When the determination in the foregoing Step 506 is YES (receiving has completed), the program proceeds to Step 540, shown in FIG. 12.

Numeral 510 is a step that acts when the determination in the mentioned Step 506 is NO (receiving flag is not operated yet), and determines whether or not the timer T1 having been started in the mentioned Step 503 and the later-described Step 511 or 561 (FIG. 12) is Time's Up. Numeral 511 is a step that acts when the determination in the foregoing Step 510 determines YES (Time's Up), and restarts the timer T1. Numeral 512a is a step that acts subsequently to the foregoing. Step 511, and determines whether or not the regular transmission is permitted already by determining an operation state of a transmission-permitting flag, not shown, that is set when the regular report permission is transmitted by a regular transmission packet 211a. Numeral 512b is a step that acts when the determination in the foregoing Step 512b is YES and when the regular transmission is permitted already, and sets a readout request flag. Numeral 513 is a step that acts subsequently to the foregoing Step 512, and adds 6 counts to a value of operation means CN1 acting as first adder-subtracter.

Numeral 514 is a step that acts subsequently to the foregoing Step 513, and determines whether or not a current value of the operation means CN1 acting as first adder-subtracter exceeds 11. Numeral 515 is a step that acts when the determination in the foregoing Step 514 is YES (in excess of 11) or when the determination in the later-described Step 522 is YES (in excess of 11), and generates a pulse output of the first error detection signal ER1. Numeral 516 is a step that acts subsequently to the foregoing Step 515, and resets the fist flag having been set in the mentioned Step 505. Numeral 517 is an operation end step that acts when the determination in the mentioned Step 514, is NO (not more than 11), or subsequently to the mentioned Step 516. Further, the mentioned operation start Step 500 circulates and operates subsequently to the foregoing Step 517.

Numeral 520 is a step that acts when the determination in the mentioned Step 510 is NO (timer T1 is not Time's Up), or when the determination in the mentioned Step 512a is NO, that is, the regular report is not permitted, and determines whether or not a save time period of a residual leading data of the reply-waiting data table (refer to numeral 203a of FIG. 9) having been written in the later-described Step 539 exceeds a predetermined reply response time period T. Numeral 521 is a step that acts when the determination in the foregoing Step 520 is YES (timeout), and adds 6 counts to a value of the operation means CN1 acting as the first adder-subtracter. Numeral 522 is a step that acts subsequently to the foregoing Step 521, and determines whether or not a current value of the operation means CN1 acting as the first adder-subtracter exceeds 11. Numeral 523 is a step that acts when the determination in the foregoing Step 522 is NO (not more than 11), and sets a retransmission request flag. The program proceeds to the mentioned operation end Step 517 subsequently to the foregoing Step 523.

In addition, the mentioned reply-waiting data table 203a is constituted of plural stages of shift register in which a stored data shifts every predetermined time period. In response to the fact that a reply-waiting command having been stored in the foregoing shift register shifts to an overflow register, the mentioned Step 520 determines timeout.

Numeral 530 is a step that acts when the determination in the mentioned Step 520 is NO (it is not timeout), and determines whether or not a readout request flag is set in the mentioned Step 512b or the later-described Steps 542 and 564 (FIG. 12). Numeral 531 is step that acts when the determination in the foregoing Step 530 is YES (readout request is present), and determines whether or not a retransmission request flag is set in the mentioned Step 523 or in the later-described Steps 542 and 551 (FIG. 12). Numeral 532a is a step that acts when the determination in the foregoing Step 531 is YES (retransmission request is present), and transmits by an irregular transmission packet 204a the old readout request having been transmitted already. Numeral 533a is a step that acts subsequently to the foregoing step 532a, and resets the retransmission request flag.

Numeral 532b is a step that acts when the determination in the mentioned Step 531 is NO (retransmission request is absent), and transmits by an irregular transmission packet 204a this time's readout request having been requested for the readout in the mentioned Step 530. Numeral 533b is a step that acts subsequently to the foregoing Step 532b, and resets a readout request flag. Numeral 539 is a step that acts subsequently to the mentioned Steps 533a and 533b or the later-described Steps 538 and 537b, and sequentially stores in the reply-waiting data table 203a command having been transmitted in the mentioned Steps 532a and 532b and the later-described Steps 537a and 537b. This Step 539 also deletes the existing leading command by performing a shift operation of the data table acting as a shift register. Then, the program proceeds to the mentioned operation end 517 subsequently to the foregoing Step 539.

Numeral 535 is a step that acts when the determination in the mentioned Step 530 is NO (readout request is absent), and determines whether or not it is the time when the regular transmission is carried out by a regular transmission packet 201a. Numeral 536 is a step that acts when the determination in the foregoing Step 535 is YES (it is the regular transmission time), and determines whether or not a retransmission request flag is set in the mentioned Step 523 or in the later-described Steps 542 and 551 (FIG. 12). Numeral 537a is a step that acts when the determination in the foregoing Step 536 is YES (retransmission request is present), and transmits a regular transmission packet 201a based on the transmission command having been transmitted already. Numeral 538 is a step that acts subsequently to the foregoing Step 537a, and resets a retransmission request flag.

Numeral 537b is a step that acts when the determination in the mentioned Step 536 is NO (retransmission request is absent), and transmits this time's regular transmission packet 201a. When the determination in the mentioned Step 535 is NO (it is not the regular transmission time), the program proceeds to the mentioned operation end step 517.

Referring now to FIG. 12, numeral 540 is a step that acts when the determination in the mentioned Step 506 (FIG. 11) is YES (receiving flag operates), and carries out a sum check of the received data.

In addition, a frame of a checksum, in which a binary addition of all frame data from a start data STX to an end data ETX is performed and a complement value thereof is stored, is added to each transmit-receive packet. Further, it is the sum check that performs the binary addition of all the frame data from a start data STX to a checksum data, and determines whether or not a result of this binary addition brings a normal value 00H.

Numeral 541 is a step that acts subsequently to the mentioned Step 540, and determines whether or not there is any error as a result of the sum check. Numeral 542 is a step that acts when the determination in the foregoing Step 541 is YES (error is present), and sets a retransmission request flag or a readout request flag. Numeral 543 is a step that acts subsequently to the foregoing Step 542, and deletes the received data in which error is present. Numeral 544 is a step that acts subsequently to the foregoing Step 543, and adds 3 counts to a value of the operation means CN1 acting as the first adder-subtracter.

In addition, when data having been received in the mentioned Step 542 cannot be discriminated among a confirmation reply packet to the regular transmission, a report reply packet to an irregular transmission packet and a regular report packet, no retransmission request flag or readout request flag is set.

Numeral 545 is a step that acts subsequently to the mentioned Step 544, and determines whether or not a current value of the operation means CN1 acting as the first adder-subtracter exceeds 11. Numeral 546 is a step that acts when the determination in the foregoing Step 545 or in the later-described Step 553 is YES (in excess of 11), and generates a pulse output of the first error detection signal ER1. Numeral 547 is a step that acts subsequently to the foregoing Step 546, and resets the first flag having been set in the mentioned Step 505 (FIG. 11). Numeral 548 is a step that acts when the determination in the mentioned Step 545 is NO (not more than 11), and executes the standby of a predetermined time period. The program proceeds to the mentioned operation end Step 517 subsequently to the mentioned Step 547, and then the mentioned operation start Step 500 operates in a circulating manner.

Numeral 550 is a step that acts when the determination in the mentioned Step 541 is NO (sum check error is absent), and determines whether or not the data having been received normally from the sub station is the one as to the receiving failure (NACK) at the sub station. Numeral 551 is a step that acts when the determination in the foregoing Step 550 is YES (it is the receiving failure), and sets a retransmission request flag. Numeral 552 is a step that acts subsequently to the foregoing Step 551, and adds 3 counts to a value of the operation means CN1 acting as the first adder-subtracter. Numeral 553 is a step that acts subsequently to the foregoing Step 552, and determines whether or not a current value of the operation means CN1 acting as the first adder-subtracter exceeds 11. When the determination in the foregoing Step 553 is YES (in excess of 11), the program proceeds to the mentioned Step 546.

Numeral 560 is a step that acts when the determination in the mentioned Step 550 is NO (it is not the receiving failure), and determines whether or not a received data is a regular report from the sub station by a regular report packet. Numeral 561 is a step that acts when the determination in the foregoing Step 560 is YES (regular report is received), and restarts a report interval timer T1. Numeral 562 is a step that acts subsequently to the foregoing Step 561, and subtracts 1 count from a value of the operation means CN1 acting as the first adder-subtracter. Numeral 563 is a step that acts subsequently to the foregoing step 562, and determines whether or not a readout request flag is set in the data having been reported regularly. Numeral 564 is a step that acts when the determination in the foregoing Step 563 is YES (readout request is present), and sets the readout request flag. Numeral 565 is a step that acts when the determination in the mentioned Step 563 is NO (readout request is absent) or subsequently to the mentioned Step 564, and stores and saves a regular report data having been received in the mentioned RAM memory 116*b* as a monitoring input data. Numeral 566 is a step that acts when the determination in the mentioned Step 553 is NO (not more than 11) or subsequently to the mentioned Step 548 or 565 or the later-described Step 574, and inverts a logic level of a transmission-permitting control signal. The program proceeds to the mentioned operation end Step 517 subsequently to the foregoing Step 566.

Figure 13:
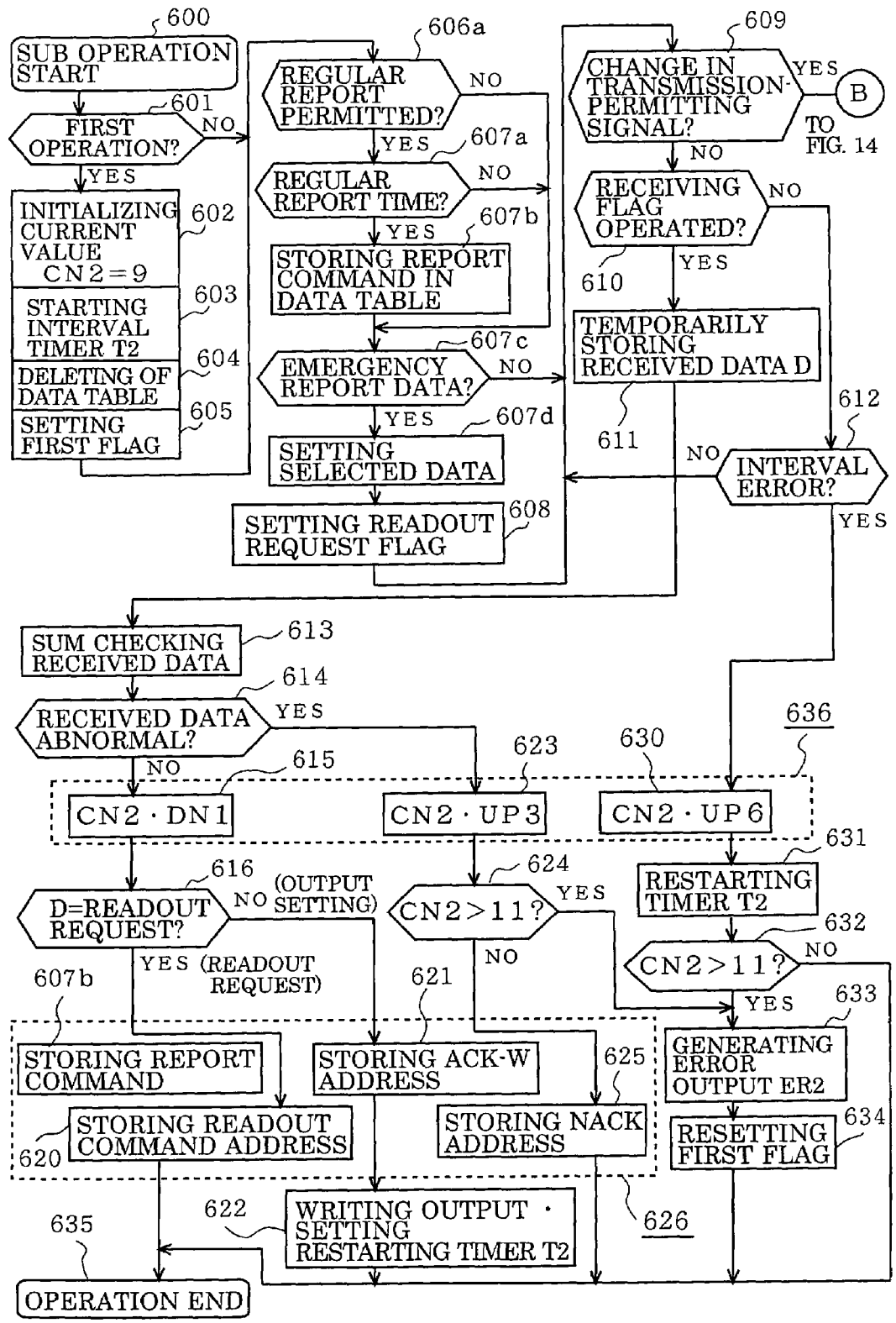
FIG. 13 is a flowchart for explaining a receiving operation at a second control circuit section of the electronic control unit according to the second embodiment.

In addition, the readout request flag in the mentioned Step 563 is the one that is set on the sub station side in Step 608 of FIG. 13.

Numeral 570 is a step that acts when the determination in the mentioned Step 560 is NO (it is not the receiving of a regular report), and determines whether or not it is the receiving of a confirmation reply. Numeral 571 is a step that acts when the determination in the foregoing Step 570 is NO (it is not a confirmation reply to the regular transmission, but a report reply to the irregular transmission), and stores an irregular readout data having been replied and reported from the sub station in the mentioned RAM memory 116*b*. Numeral 572 is a step that acts subsequently to the foregoing Step 571, and resets a readout request flag having been set in the mentioned Step 512*b* (FIG. 11) or the mentioned Steps 542 and 564. Numeral 573 is a step that acts when the determination in the mentioned Step 570 is YES (confirmation reply of the normal receiving to the regular transmission), or subsequently to the mentioned Step 572, and subtracts 1 count from a value of the operation means CN1 acting as the first adder-subtracter. Numeral 574 is a step that acts subsequently to the foregoing Step 573, and erases a command, which is replied from the reply-waiting data table 203*b*, having been stored in the mentioned Step 539. The program proceeds to the mentioned Step 566 subsequently to the foregoing Step 574.

Describing the above-described operations in brief, with reference to FIG. 11, numeral 502 is first initialization means that sets a current value of operation means CN1 acting as first adder-subtracter at an initialization value 9. Numeral 510 is first communication error determination means acting as receiving interval monitoring means of the regular report. Numeral 515 is first error occurrence definition means for generating the first error detection signal ER1. Numeral 520 is first communication error determination means acting as reply delay monitoring means. Numeral 524 is first adder-subtracter consisting of Steps 513 and 521. Numeral 532*a* is retransmission means of an irregular transmission packet responsive to the retransmission request. Numeral 532*b* irregular transmission means responsive to the readout request. Numeral 537*a* is retransmission means to the regular transmission. Numeral 537*b* is regular transmission means.

Further, with reference to FIG. 12, numeral 540 is first communication error determination means acting as bit information monitoring means. Numeral 546 is first error occurrence definition means for generating the first error detection signal ER1. Numeral 566 is transmission-permitting control signal generation means. Numeral 575 is first adder-subtracter consisting of Steps 544, 552, 562, and 573.

Figure 14:
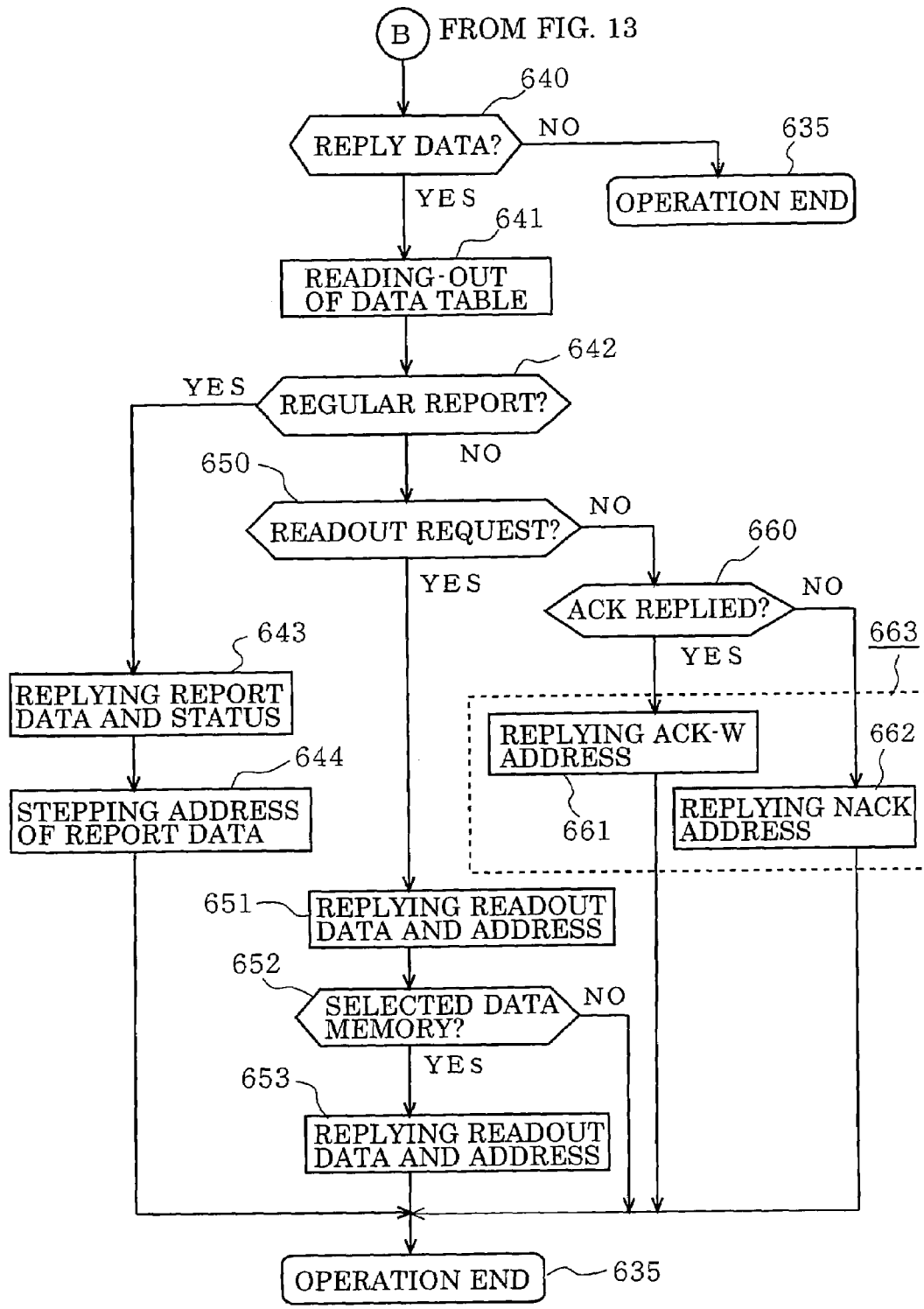
FIG. 14 is a flowchart for explaining a transmission operation at the second control circuit section of the electronic control unit according to the second embodiment.

Now, with reference to FIGS. 13 and 14, a communication control operation in the second control circuit section of the electronic control unit according to this second embodiment is described.

In this connection, FIG. 13 shows mainly a control flow as to a receiving operation of the auxiliary CPU 120*b* in the second control circuit section 210*b*. FIG. 14 shows mainly a control flow as to a transmission operation of the auxiliary CPU 120*b* in the second control circuit section 210*b*.

With reference to FIG. 13, numeral 600 is an operation start step of the auxiliary CPU 120*b* that is regularly activated. The foregoing start step is activated when the power supply switch 105*b* of FIG. 8 is turned on and when a reset pulse signal RST2 is supplied. This Step 600 operates in a circulating manner subsequently to the later-described operation end step 635.

Numeral 601 is a step that acts subsequently to the mentioned Step 600, and determines whether or not it is a first operation depending on whether or not a first flag is set in the later-described Step 605. Numeral 602 is a step that acts when the determination in the foregoing Step 601 is YES (it is the first operation), and sets a current value of the second adder-subtracter 208*b* to an initial value "9". Numeral 603 is a step that acts subsequently to the foregoing Step 602, and starts an interval timer T2, the interval of which corresponds to an upper limit value of a regular transmission cycle. Numeral 604 is a step that acts subsequently to the foregoing Step 603, and deletes content in the unprocessed data table 203*b* of FIG. 9. Numeral 605 is a step that acts subsequently to the foregoing Step 604, and sets the first flag, not shown. The mentioned first flag is reset when the power supply switch 105*b* of FIG. 8, not shown, is turned on, and when a reset pulse signal RST2 is supplied to the auxiliary CPU 120*b*.

Numeral 606*a* is a step that acts when the determination in the mentioned Step 601 is NO (it is not the first operation) or subsequently to the mentioned Step 605, and determines whether or not the regular report is permitted upon receipt of a regular transmission packet 211*a* of FIG. 10. Numeral 607*a* is a step that acts when the determination in the foregoing Step 606 is YES (regular report is permitted), and determines whether or not it is a regular report time received after a predetermined time period has passed since the last report. Numeral 607*b* is a step that acts when the determination in the foregoing Step 607*a* is YES (regular report time has come), and stores a regular report command in the unprocessed data table 203b of FIG. 9.

Numeral 607c is a step that acts when the determination in the mentioned Step 606a is NO (regular report is not permitted yet), when the determination in the mentioned Step 607a is NO (regular report time has not come yet) or subsequently to the mentioned Step 607b, and determines whether or not any error is detected by, e.g., self-diagnosis of an input/output performed by the auxiliary CPU 120b, and there is any request for this error to be immediately reported to the master station. Numeral 607d is a step that acts when the determination in the foregoing step 607c is YES (emergency report data is present), and writes data content such as error occurrence input/output number or error code number intended to be reported to a selected data memory of a specified address. Numeral 608 is a step that acts subsequently to the foregoing Step 607d, and sets a readout request flag. Numeral 609 is a step that acts when the determination in the mentioned Step 607c is NO (emergency report data is absent) or subsequently to the mentioned Step 608, and determines whether or not logic level of a transmission-permitting control signal 207a is inverted and a transmission permission to the master station is given.

In addition, when the determination in the mentioned Step 609 is YES (change in transmission-permitting signal is present), the program proceeds to Step 640 of FIG. 14.

Numeral 610 is a step that acts when the determination in the mentioned Step 609 is NO (transmission is not permitted), and determines whether or not a receiving flag is operated indicating the fact that the second series-parallel converter 127 receives a serial data having been transmitted from the first series-parallel converter 117 and that a parallel conversion completes.

Numeral 611 is a step tat acts when the determination in the mentioned Step 610 is YES (receiving flag operates), and temporarily stores a series of data having been received from the master station in a register D.

Numeral 612 is a step that acts when the determination in the mentioned Step 610 is NO (has not received yet), and determines whether or not the receiving interval monitoring timer T2 having been started in the mentioned Step 603 or the later-described Steps 622 and 631 is Time's Up. When the determination in the foregoing Step 612 is NO (has not passed yet), the program returns to the mentioned Step 609.

Numeral 613 is a step that acts subsequently to the mentioned Step 611, and carries out a sum check of a series of data having been received by the mentioned Step 611. Numeral 614 is a step that acts subsequently to the foregoing Step 613, and determines whether or not there is any error in the received data. Numeral 615 is a step that acts when the determination in the foregoing Step 614 is NO (normal), and subtracts 1 count from a value of the operation means CN2 acting as the second adder-subtracter. Numeral 616 is a step that acts subsequently to the foregoing Step 615, and determines whether a data received by the mentioned Step 611 is the output setting by a regular transmission packet 201a or the readout request by an irregular transmission packet 204a.

Numeral 620 is a step that acts when the determination in the mentioned Step 616 is the readout request, and temporarily stores a readout request command 30H and the address provided by an irregular transmission packet 204a of FIG. 10. Numeral 621 is a step that acts when the determination in the mentioned Step 616 is the output setting, and temporarily stores an ACK-61H and the address provided by a confirmation reply packet 201c of FIG. 10. Numeral 622 is a step that acts subsequently to the foregoing Step 621, and stores an output set data having been obtained in the mentioned Step 611 in a memory of a specified address, and restarts the receiving interval monitoring timer T2.

Numeral 623 is a step that acts when the determination in the mentioned Step 614 is YES (received data is abnormal), and adds 3 counts to a value of the operation means CN2 acting as the second adder-subtracter. Numeral 624 is a step that acts subsequently to the foregoing Step 623, and determines whether or not a current value of the operation means CN2 acting as the second adder-subtracter exceeds 11. Numeral 625 is a step that acts when the determination in the foregoing Step 624 is NO (not more than 11), and temporarily stores an NACK-82H and the address. The program proceeds to the mentioned operation end step 635 subsequently to the mentioned Steps 620, 622, 625.

Numeral 626 is a step block consisting of the mentioned Steps 607b, 620, 621, 625. This step block is a report reply command data to be stored in the unprocessed data table 203b of FIG. 9.

In addition, an NACK reply code corresponding to the readout request or the output setting is not separated in the mentioned Step 625. As shown in FIG. 10, however, it is also possible to separate this NACK reply code at 62H or 72H by noting a start data STX.

Numeral 630 is a step that acts when the determination in the mentioned Step 612 is YES (receiving interval of a regular transmission data is too large), and adds 6 counts to a value of the operation means CN2 acting as the second adder-subtracter. Numeral 631 is a step that acts subsequently to the foregoing Step 630, and restarts the receiving interval timer T2. Numeral 632 is a step that acts subsequently to the foregoing Step 631, and determines whether or not a current value of the operation means CN2 acting as the second adder-subtracter exceeds 11. Numeral 633 is a step that acts when the determination in the foregoing Step 632 is YES (in excess of 11) or when the determination in the mentioned Step 624 is YES (in excess of 11), and generates a pulse output of the second error detection signal ER2. Numeral 634 is a step that acts subsequently to the foregoing Step 633, and resets the first flag having been set in the mentioned Step 605. The program proceeds to the mentioned operation end Step 635 when the determination in the mentioned Step 632 is NO (not more than 11), or subsequently to the mentioned Step 634.

Referring now to FIG. 14, numeral 640 is a step that acts when the determination in mentioned Step 609 (FIG. 13) is YES (transmission is permitted), and determines whether or not there is any report reply command having been store in the unprocessed data table 203b in the mentioned step block 626. Numeral 641 is a step that acts when the determination in the foregoing Step 640 is YES (report reply command is present), and reads out on the basis of first-in first-out a report reply command having been stored in the mentioned unprocessed data table 203b. Numeral 642 is a step that acts subsequently to the foregoing Step 641, and determines whether or not the report reply command having been read out in the mentioned Step 641 is a regular report command having been stored in the mentioned Step 607b. Numeral 643 is a step that acts when the determination in the foregoing Step 642 is YES (it is the regular report command) and transmits a regular report packet 206a of FIG. 10. Numeral 644 is a step that acts subsequently to the foregoing Step 643, and steps an address of data to be regularly reported next. The program proceeds to the mentioned operation end Step 635 subsequently to the foregoing Step 644.

Numeral 650 is a step that acts when the determination in the mentioned Step 642 is NO (it is not the regular report command), and determines whether or not a report reply command having been read out in the mentioned Step 641 is a readout request command having been stored in the mentioned Step 620. Numeral 651 is a step that acts when the determination in the foregoing Step 650 is YES (it is the readout request), and reports and replies a readout data as to a memory of a specified address together with the corresponding address.

Numeral 652 is a step that acts subsequently to the mentioned Step 651, and determines whether or not the address of data having been reported and replied in Step 651 is the address of a selected memory in which data has been written in the mentioned Step 607*d*. Numeral 653 is a step that acts when the determination in the foregoing Step 652 is YES (it is a selected data memory), and resets a readout request flag having been set in the mentioned Step 608. When the determination in the mentioned Step 652 is NO (it is not the selected data memory) or subsequently to the mentioned Step 653, the program proceeds to the mentioned operation end Step 635.

Numeral 660 is a step that acts when the determination in the mentioned Step 650 is NO and it is not a readout request or when although it may be a readout request, it is a receiving failure. This Step 660 further determines whether a report reply data having been read out in the mentioned Step 641 is an ACK-W (normal receiving with respect to the regular transmission) having been stored in the mentioned Step 621, or a NACK having been stored in mentioned Step 625. Numeral 661 is a step that acts when the determination in the foregoing Step 660 is YES (ACK-W), and replies an acknowledged data ACK and the corresponding address. Numeral 662 is a step that acts when the determination in the mentioned Step 660 is NO (NACK), and replies a non-acknowledged data NACK and the corresponding address. When the determination in the mentioned Step 650 is NO (reply data is absent) or subsequently to the mentioned Steps 661 and 662, the program proceeds to the mentioned operation end Step 635.

In addition, numeral 663 is a step block consisting of the mentioned Steps 661 and 662. The foregoing step block corresponds to the transmission of confirmation reply packets 201*c*, 211*c*, 214*c*, 221*c* of FIG. 10. The mentioned Step 651 corresponds 53 to the transmission of a regular report packet 206*a* of FIG. 10. The mentioned Step 643 corresponds to the transmission of a regular report packet 206*a* of FIG. 10.

Describing the above-described operations in brief, with reference to FIG. 13, numeral 602 is second initialization means that sets a current value of operation means CN2 acting as a second adder-subtracter to an initialization value 9. Numeral 608 is readout request setting means by which the sub station makes the readout request for a content of a selected data memory of a specified address with respect to the master station. Numeral 612 is second communication error determination means acting as receiving integral monitoring means of a regular transmission packet. Numeral 613 is second communication error determination means acting as bit information monitoring means as to the data having been transmitted from the master station. Numeral 633 is second error occurrence definition means generating the second error detection signal ER2. Numeral 636 is second adder-subtracter consisting of Steps 615, 623, 630.

Further, with reference to FIG. 14, numeral 643 is regular report means for transmitting a regular report packet. Numeral 651 is report reply means for transmitting a report reply packet responsive to the readout request. Numeral 663 is confirmation reply means for transmitting a confirmation reply packet of the normal receiving or the receiving failure.

The action and operation are described in brief referring to FIGS. 8, 9, and 10 on the basis of the flowcharts in FIGS. 11 to 14.

With reference to FIG. 8, the main CPU 110*b* takes an output from the first and second input sensor groups 102*a* an 102*b* and the first and second analog sensor groups 103*a* and 103*b* as an input signal, and controls the first and second electrical load groups 104*a* and 104*b* based on a control program or a control constant that is stored in the non-volatile program memory 115*b*. However, the mentioned second input sensor group 102*b*, the second analog sensor group 103*b* and the second electrical load group 104*b* perform a serial communication indirectly with the main CPU 110*b* via the first and second series-parallel converters 117 and 127.

In addition, although any analog output is not utilized in the second embodiment shown in FIG. 8, it is also possible to mount a DA converter for meter display as an indirect output, when required.

When the first error detection signal ER1 is generated in the first control circuit section 210*a*, the first flag is rest in Step 516 of FIG. 11 or in Step 547 of FIG. 12, and then the program proceeds to the operation end Step 517. Therefore, when the program goes to the operation start Step 500 again, initialization of the first control circuit section 210*a* itself is carried out in Steps 502-505.

On the other hand, a reset pulse signal is inputted to a reset input terminal RST2 of the second control circuit section 210*b* by the first error detection signal ER1, thus the second control circuit section 210*b*, being the other side, is initialized and restarted as well.

Likewise, when the second error detection signal ER2 is generated in the second control circuit section 210*b*, the first flag is rest in Step 634 of FIG. 13, and then the program proceeds to the operation end Step 635. Therefore, when the program goes to the operation start step 600 again, initialization of the second control circuit section 210*b* itself is carried out in Steps 602-605.

On the other hand, a reset pulse signal is inputted to a reset input terminal RST1 of the main CPU 110*b* in the first control circuit section 210*b* by the second error detection signal ER2, thus the first control circuit section 210*a*, being the other side, is also initialized and restarted as well.

The first and second control circuit sections 210*a* and 210*b* are initialized and restarted also by a reset pulse signal RST1 from the watchdog timer 130. Upon, however, generation of the first and second error detection signals ER1 and ER2 or the reset pulse signals RST1 and RST2, the error storage circuit 131*b* acting as error occurrence storage means counts and stores the generation of signals to bring the alarm and display 108 in operation at the time of reaching a predetermined count value. Further, the foregoing count storage circuit 131*b* stops the operation of the load power supply relay 107*a* so that a power feed to a part of specified electrical loads is stopped.

Accordingly, in the case where the main CPU 110*b* temporarily malfunctions due to noise malfunction, a reset pulse RST1 automatically restarts the main CPU. However, the frequent occurrence of such malfunctions brings a part of electrical loads in the state of drive stop through the load power supply relay 107*a*.

Nevertheless, when the power supply switch 105*b* is turned on again, the error storage of the error storage circuit 131*b* is cleared, thereby enabling to recover the normal operation state.

With reference to FIGS. 9 and 10, a basic transmit-receive communication packet in this second embodiment is constituted of an output setting by the regular transmission means 201*a* from the master station to the sub station, and an input readout by the regular report means 206*a* from the sub station to the master station.

However, to prevent an erroneous output setting, a receiving confirmation packet is replied by the confirmation reply means 201*c* or 211*c* from the sub station to the master station in response to the transmission from the master station to the sub station.

Further, it is possible for the master station to read out data on the sub station side by the readout request by the irregular transmission means 204*a*. Furthermore, it is possible for the sub station side to work in a positive manner to read out information of a specified address with the readout request by setting a readout request flag in the regular report.

In addition, supposing that there is only a reciprocating communication in which a master station transmits and the sub station replies to this transmission, the master station waits for the reply from the sub station and then carries out the next transmission, thereby enabling to avoid jam-up of communication.

However, supposing that the sub station side intends to transmit the regular report to the master station without any command from the master station, the jam-up will occur in an upstream communication.

The unprocessed data table 203*b* is to make a queue of un-replied information, and sequentially replies this information when occurring such jam-up, thereby enabling to execute the regular transmission or the regular report on a timely basis.

Furthermore, it is arranged such that the regular report from the sub station is inhibited at the start of operation start when there are a large amount of data of downstream communication; and the main CPU 110*b* transmits an initial set data in a concentrated manner, and makes the readout request by an irregular transmission packet on a timely basis to be capable of reading out an indirect input information.

As has been obvious from the above description, the electronic control unit 100*b* according to the second embodiment is arranged such that: a first control circuit section 210*a* includes a program memory 115*b* including input/output control means and communication control means, an operation processing RAM memory 116*b*, a microprocessor 110*b* cooperating with mentioned program memory 115*b*, and a first series-parallel converter 117; and a second control circuit section 210*b* includes at least an auxiliary CPU 102*b* acting as a communication control circuit section for carrying out a communication of a monitoring and control signal, a program memory 125 cooperating with this auxiliary CPU and a RAM memory 126*b* acting as a data memory, and a second series-parallel converter 127. The mentioned first control circuit section 210*a* and the second control circuit section 210*b* mutually carry out a serial communication of a monitoring and control signal via the mentioned first and second series-parallel converters. The mentioned first control circuit section 210*a* further includes regular transmission means 201*a* and transmission-permitting control signal generation means 207*a*, and the mentioned second control circuit section 210*b* further includes confirmation reply means 201*c*, regular report means 206*a*, and an unprocessed data table 203*b*.

The mentioned regular transmission means 201*a* is write setting means for regularly transmitting a control output data or a constant set data from the mentioned first control circuit section 210*a* to the mentioned second control circuit section 210*b*, and writing and storing in the mentioned RAM memory 126*a*, acting as a data memory, an output and set data having been received at the mentioned second control circuit section 210*b*.

The mentioned confirmation reply means 201*c* is communication means for executing a confirmation reply of whether the mentioned second control circuit section 210*b* has normally received or failed to receive the mentioned regular transmission data, and for requesting a retransmission processing from the first control circuit section 210*a* to the second control circuit section 210*b* on the supposition of the receiving failure.

The mentioned regular report means 206*a* is input readout means for regularly reporting a monitoring input data and status information from the mentioned second control circuit section 210*b* to the mentioned first control circuit section 210*a*, and for storing in the mentioned RAM memory 116*b* this regular report data that the mentioned first control circuit section 210*a* has normally received.

The mentioned unprocessed data table 203*b* acts as a receiving-side command memory of a first-in first-out system that is provided in the mentioned second control circuit section 210*b*, and arranged so as to sequentially save a command data for executing the mentioned regular report and a command data for executing the mentioned confirmation reply, and to sequentially erase this saved data when transmitting a regular report and a confirmation reply data to the first control circuit section 210*a*.

The mentioned transmission-permitting control signal generation means 207*a* acts as control signal transmission means from the mentioned first control circuit section 210*a* to the mentioned second control circuit section 210*b*, by which means the second control circuit section 210*b* having received this signal starts to execute the transmission of the most first-in leading command in the mentioned unprocessed data table 203*b*, and adds the latest monitoring input data and status information thereto and transmits a resulting command in the case where this leading command is a regular report. The mentioned unprocessed data table 203*b* carries out a transmission standby as a measure for delay in signal generation from the mentioned transmission-permitting control signal generation means 207*a* or congestion in confirmation reply and regular report to prevent a communication jam-up.

As a result, likewise in the case of the foregoing first embodiment, it is possible for the second control circuit section to execute the regular report at one's own initiative even if there is no request from the first control circuit section. However, this regular reporting is carried out based on a transmission-permitting control signal that the first control circuit section generates, thereby enabling to diminish a communication control burden on the first control circuit section.

Further, in the case where the generation of a transmission-permitting control signal is delayed due to congestive situation on the first control circuit section side, or the confirmation reply and the regular report take place generally at the same time, a transmission standby is carried out with the unprocessed data table to be capable of preventing the communication jam-up. Consequently, it is possible to further diminish a communication control burden on the first control circuit section.

Furthermore, it is possible to transmit the latest information at the moment of transmission of the regular report to the first control circuit section.

In the electronic control unit 100b according to this second embodiment, the mentioned transmission-permitting control signal generation means 207a generates a control signal, a logic level of which inverts alternately every time the mentioned first control circuit section 210b receives a regular report or a confirmation reply data from the mentioned second control circuit section 210b.

As a result, it is possible for the second control circuit section 210b to detect a receiving state on the other side by monitoring the presence or absence of any change in logic level of a transmission-permitting control signal after a predetermined time period has passed since the transmission to the first control circuit section 210a.

Further, in the electronic control unit 100b according to the second embodiment, the mentioned first control circuit section 210a further includes regular report permission means 211a. This regular report permission means is means for storing a command data that is transmitted by the mentioned regular transmission means 201a to a predetermined address of memory provided in the mentioned second control circuit section 210b, and a normal confirmation reply responsive to the mentioned regular transmission is replaced with the transmission of a regular report 206a when the regular report is permitted.

As a result, an advantage exists in that a communication control burden on the master station side can be diminished by setting the regular report not to be permitted when there are much downstream communication of various set information from the first control circuit section 210a acting as the master station at the start of operation start to the second control circuit section 210b acting as the sub station; and the normal confirmation reply 201c from the sub station is omitted in the state of normal operation, thereby likewise enabling to diminish a communication control burden on the master station side.

Furthermore, in the electronic control unit 100b according to the second embodiment, the mentioned first control circuit section 210a further includes irregular transmission means 204a, and the mentioned second control circuit section 210b further includes report reply means 204c.

The mentioned irregular transmission means 204a acts as readout request means that is capable of being applied when there is any error in a report communication provided by the mentioned regular report means 206a, and that is applied when necessary so that the mentioned first control circuit section 210a may read out and confirm a monitoring input data of a specified address with respect to the second control circuit section 210b, and may read out and check a write save data having been written and set by the mentioned regular transmission means 201a.

The mentioned report reply means 204c acts as communication means which performs a report reply of a monitoring input data or a write save data of a specified address as a confirmation reply to the fact that the mentioned second control circuit section 210b has received the mentioned irregular transmission data, and to which a readout request is made again by retransmission request means 204e provided in the first control circuit section 210a on the supposition of presence of any communication error in the mentioned report reply.

A communication command to the mentioned report reply means 204c is stored once in the mentioned unprocessed data table 203b, and transmitted to the mentioned first control circuit section 210a along with a report reply data in response to a control signal provided by the mentioned transmission-permitting control signal generation means 207a.

As a result, even if the confirmation reply or the retransmission processing with respect to the regular report is omitted, the confirmation can be made by the readout request provided by the irregular transmission means when required. Consequently, an advantage exists in that a communication amount on a steady basis is reduced, thereby enabling to diminish burden of the communication control.

Furthermore, it is possible to read out and check information having written and set by the regular transmission means 201a on a timely basis.

In the electronic control unit 100b according to the second embodiment, the mentioned first control circuit section 210a further includes a reply-waiting data table 203a and retransmission means 532a and 537a; the mentioned reply-waiting data table 203a acts as a transmission-side command memory arranged so as to sequentially save a transmission command that the mentioned first control circuit section 210a has transmitted by regular transmission means 201a and irregular transmission means 204a to the second control circuit section 210b; and to sequentially erase this save command when receiving a confirmation reply data or a report reply data from the second control circuit section 210b.

The mentioned retransmission means 532a and 537a act as means for operating when any communication error is present in confirmation reply or report reply to the mentioned regular transmission means 201a or irregular transmission means 204a, or when a leading transmission command having been stored in the mentioned transmission-side command memory is not erased even if a predetermined time period has passed; and a transmission command having been transmitted again is deleted from and stored again in the mentioned transmission-side command memory, thus a first-in first-out processing being carried out.

As a result, it is easy to determine whether or not there is any confirmation reply; and it is possible to easily decide a command to be retransmitted and processed at the time of occurrence of any communication error.

In the electronic control unit 100b according to the second embodiment, the mentioned second control circuit section 210b further includes readout request setting means 608.

This readout request setting means 608 acts as means for requesting readout of a selected data memory of a specified address, which is provided in the mentioned second control circuit section 210b, by adding a readout request flag to a status information 205b contained in the mentioned regular report means 206a.

The mentioned first control circuit section 210a is arranged to operate when any communication error is present in the mentioned regular report data or when the mentioned readout request is present, and to be capable of making a readout request for a regular report content or a selected data memory 205c by the mentioned irregular transmission means 204a.

As a result, it is possible that the second control circuit section 210b not merely executes a regular report, but also makes a request to immediately read out a content of the selected data memory 205c, when required. Consequently, it is possible to immediately report to the first control circuit section 210a error information other than a communication error while reducing amount of regular report data.

Further, in the electronic control unit 100b according to the second embodiment, the mentioned first control circuit section 210a further includes first communication error determination means 510, 520, 540, first adder-subtracter 524, 575, and first error occurrence definition means 515, 546; and the mentioned second control circuit section 210b further includes second communication error determination means 612, 613, second adder-subtracter 636, and second error occurrence definition means 633.

The mentioned first and second communication error determination means act as receiving error determination means for determining the presence or absence of any error of various regular and irregular communication packets, which the control circuit section on the side where this determination means is provided has received from the other control circuit section, or determining a state of being incapable of receiving a communication packet to be received.

The mentioned first and second adder-subtracters act as operation means that adds a second variation value "3" when the mentioned receiving error determination means determines the presence of error, and subtracts a first variation value "1" when the receiving error determination means determines the absence of error to perform an addition-subtraction compensation with respect to a current value memory so as to mutually counteract, and stops a subtraction compensation by mentioned first variation value at a current value "0", being a predetermined normal-side limit value, when the determination of the absence of error continues.

The mentioned first and second error occurrence definition means acts as comparison means for generating error detection signals ER1 and ER2 when a current value of the mentioned adder-subtracter exceeds a predetermined abnormal-side limit value "11" resulted from accumulation of the mentioned first and second variation values.

The mentioned second variation value "3" is set to be a value smaller than a permitted accumulation value "11", being difference between the mentioned abnormal-side limit value "11" and normal-side limit value "0", and initialization and restart of the mentioned first or second control circuit section is carried out responsive to the generation of the mentioned error detection signals ER1 and ER2.

As a result, an advantage exists in that a too sensitive error determination is not carried out with respect to a sporadic and chronic error. Furthermore, in the case where a communication error still occurs in spite of continuation of the retransmission processing, an error determination is made responsive to the fact that a current value of the first adder-subtracter exceeds an abnormal-side limit value "11", and the initialization and restart is carried out. Consequently, it is possible to rationally regulate the permitted number of times of retransmission depending on the past history of whether or not normal communication has continued.

In the electronic control unit 100b according to the second embodiment, the mentioned first control circuit section 210a further includes first initialization means 502, and the mentioned second control circuit section further includes second initialization means 602. The mentioned first initialization means 502 operates when the mentioned first error occurrence definition means generates an error detection signal ER1, resets a current value of the mentioned first adder-subtracter to a predetermined initialization value at the start of operation, and the mentioned error detection signal ER1 initializes and restarts an auxiliary CPU 120b acting as a communication control circuit section provided in the mentioned second control circuit section 210b.

The mentioned second initialization means 602 operates when the mentioned second error occurrence definition means generates an error detection signal ER2, resets a current value of the mentioned second adder-subtracter to a predetermined initialization value at the start of operation. The mentioned error detection signal ER2 initializes and restarts a microprocessor 110b provided in the mentioned first control circuit section 210a.

An initialization value "9" of the first and second adder-subtracters to be reset by the mentioned first and second initialization means is a value close to the mentioned abnormal-side limit value "11" apart from the mentioned normal-side limit value "0".

As a result, it is possible to initialize a control circuit section on the other side without depending on any communication line where an error occurs; and a current value of the adder-subtracter is made close to an abnormal-side limit value at the time of restart, thereby enabling to improve safety shortly after the start-up.

In the electronic control unit 100b according to the second embodiment, the mentioned first communication error determination means further includes bit information monitoring means 540, reply delay monitoring means 520, and receiving interval monitoring means 510, and the mentioned second communication error determination means further includes bit information monitoring means 613 and receiving interval monitoring means 612.

The mentioned bit information monitoring means 540 and 613 act as bit error determination means for determining the presence or absence of any lack or mix in bit information such as parity check or a sum check relative to a serial data communicated between the mentioned first and second control circuit sections.

The mentioned reply delay monitoring means 520 acts as reply response error determination means for making an error determination at the first control circuit section 210a when a reply data from the mentioned second control circuit section 210b in response to a data, which the mentioned first control circuit section 210a has transmitted, cannot be received even when a predetermined reply response time period has passed.

The mentioned receiving interval monitoring means 510 and 612 act as receiving interval error determination means for making an error determination when a receiving interval time period of the other-side control circuit section with respect to a regular transmission data that the mentioned first control circuit section 210a transmits or a regular report data that the mentioned second control circuit section 210b transmits, exceeds a predetermined value. The mentioned adder-subtracter performs an addition-subtraction compensation by a first variation value "1" when none of the mentioned bit information monitoring means, reply delay monitoring means, and receiving interval monitoring means makes an error determination.

As a result, a variety of determinations of communication error enable improvement in detection accuracy as well as early detection for a communication error; and it is possible to make a highly accurate error determination due to the fact that definition of an error occurrence is carried out with data collected at a pair of adder-subtracters.

In the electronic control unit 100b according to the second embodiment, the mentioned second variation value "3", which the mentioned adder-subtracter adds or subtracts when the determination by the mentioned bit information monitoring means 540 and 613 is a communication error, is to be a value larger than the mentioned first variation value "1". A variation value, which the mentioned adder-subtracter adds or subtracts when the determination by the mentioned reply delay monitoring means 520 or receiving interval monitoring means 510 and 612 is a communication error, is to be a third variation value "6", being a value different from the mentioned second variation value "3". This third variation value is to be a value smaller than a permitted accumulation value "11", being a difference between the mentioned abnormal-side limit value "11" and normal-side limit value "0".

As a result, it is possible to make the error determination with weighting a variety of determinations of a communication error. Furthermore, it is unnecessary to set an excessive float as to a determination threshold value for a timeout error such as reply delay or over-receiving interval, and it is possible to set a determination time period appropriate for a raw capability, thereby enabling to make a highly accurate timeout determination.

In the electronic control unit 100b according to the second embodiment, the mentioned first control circuit section 210a further includes direct input/output signal interface circuits 112a and 114a, and the mentioned second control circuit section 210b further includes a watchdog timer 130 and error occurrence storage means 131a.

The mentioned direct input/output signal interface circuit is bus-connected to the mentioned microprocessor 110b; this microprocessor 110b is arranged so as to generate an output signal in response to a direct input signal having been inputted via the mentioned direct input signal interface circuit 112a, an indirect input signal having been received by a serial communication from a second series-parallel converter provided in the mentioned second control circuit section 210b, and a content of the mentioned program memory 115b to drive a first electrical load group 104a, which is connected to the mentioned direct output signal interface circuit 114a; and to transmit an indirect output signal via the mentioned first and second series-parallel converters to the second control circuit section 210b.

The mentioned watchdog timer 130 acts as a run-away monitoring timer circuit that monitors a watchdog clear signal, being a pulse train, generated by the mentioned microprocessor 110b, and generates a reset pulse signal RST1 when a pulse width of this watchdog clear signal WD1 exceeds a predetermined value; and a count storage circuit 131b acting as the mentioned error occurrence storage means is an error storage circuit that stores an coefficient of the mentioned first and second error detection signals ER1 and ER2 or a reset pulse signal RST1 to bring annunciation means 108 such as alarm, display, printing, and history save in operation when the mentioned error detection signals are generated and when the reset pulse signal provided by the mentioned watchdog timer 130 is generated.

The mentioned microprocessor 110b is initialized and restarted when the mentioned watchdog timer 130 generates a reset pulse signal RST1 and when the mentioned second error detection signal ER2 is generated; and an auxiliary CPU 120b, being a communication control circuit section of the mentioned second control circuit section 210b, is initialized and restarted when the mentioned watchdog timer 130 generates a reset pulse signal RST1 and when the mentioned first error detection signal ER1 is generated.

As a result, it is possible to restart the main CPU 110b without depending on any communication line where an error occurs; and while an error detection signal regarding communication is generated responsive to plural times of communication errors, the occurrence of a watchdog timer error immediately causes the error storage or the restart, thereby enabling to change the weighting on the error processing to announce the error.

Further, even in the case where the error is a temporary noise malfunction of the microprocessor 110b, and the microprocessor 110b is immediately restarted in a normal way, the fact that the error occurs continuously is well indicated, thereby enabling to induce maintenance inspection.

Furthermore, in the electronic control unit 100b according to the second embodiment, the mentioned second control circuit section 210b further includes an auxiliary CPU 120b, and the mentioned first control circuit section 210a further includes run-away monitoring means with respect to the mentioned auxiliary CPU 120b.

The mentioned auxiliary CPU 120b acts as a microprocessor that is contained in the mentioned second control circuit section 210b along with an auxiliary program memory 125 cooperating with this auxiliary CPU, an operation processing auxiliary RAM memory 126b, indirect input/output signal interface circuits 122b and 124b and a second series-parallel converter 127. The mentioned auxiliary CPU 120b transmits to the first control circuit section 210a via the mentioned first and second series-parallel converters an indirect input signal associated with a signal having been inputted via the mentioned indirect input signal interface circuit 122b. Further, the mentioned auxiliary CPU 120b drives a second electrical load group 104b that is connected to the mentioned indirect output signal interface circuit 124b with an output associated with an indirect output signal having been received from the mentioned first control circuit section 210a via the mentioned first and second series-parallel converters 117 and 127.

The mentioned run-away monitoring means is means for monitoring with a microprocessor 110b acting as a main CPU provided in the mentioned first control circuit section 210a a watchdog clear signal WD2, being a pulse train that the mentioned auxiliary CPU 120b generates, and for generating a reset pulse signal RST1 when a pulse width of this watchdog clear signal WD2 exceeds a predetermined value.

When the mentioned run-away monitoring means generates a reset pulse signal RST2, when said watchdog timer 130 generates a reset pulse signal RST1 and when mentioned first error detection signal ER1 is generated, the mentioned auxiliary CPU 120b is initialized and restarted, and the mentioned error storage circuit 131b is arranged to count and store the occurrence of error.

As a result, an advantage exists in that the auxiliary CPU: 120b can be restarted without depending on any communication line where an error occurs; and that it is possible to change the weighting for the error processing with respect to the occurrence of a communication error and a run-away error monitored by the run-away monitoring means, and announce the error.

Further, even in the case where the error is a temporary noise malfunction of the auxiliary CPU 120b and the auxiliary CPU 120b is immediately restarted in a normal way, the fact that the error has occurred continuously is well indicated, thereby enabling to induce a maintenance inspection.

Furthermore, in the electronic control unit 100b according to the second embodiment, the mentioned error occurrence storage means 131b is constituted of a count storage circuit.

This count storage circuit counts an OR output with respect to the mentioned first and second error detection signals ER1 and ER2 and resets pulse signals RST1 and RST2 provided by the watchdog timer 130 or the run-away monitoring means, and brings the mentioned annunciation means in operation when this count value reaches a predetermined value.

As a result, it is possible to set a determination threshold value of the watchdog timer 130 or run-away monitoring means to be a strict value matching a raw capability cycle of watchdog clear signals WD1 and WD2, thereby enabling to make an accurate run-away determination and prevent giving an error alarm in vain.

Further, since OR means is provided, the communication error resulted from the run-away error is not counted redundantly.

In the electronic control unit 100b according to the second embodiment, the mentioned second control circuit section further includes driving stop means 132b and clear means. This driving stop means 132b acts as a gate circuit that operates when a count value of the mentioned count storage circuit 131b is not less than a predetermined value, and inhibits driving specified electrical loads, being a part of the mentioned electrical load group. The mentioned clear means acts as means for initializing a current value of the mentioned count storage circuit 132b by manual operation such as turning on again a power supply switch 105b.

As a result, even in the case where an error is a temporary noise malfunction and the electronic control unit is immediately restarted normally, driving specified electrical loads that may affect on safety is stopped when such error occurs frequently, thereby improving safety. Further, it is possible to cause the electronic control unit to return to normal operation state by manual operation.

In addition, the aforementioned electronic control unit according to the first embodiment or the second embodiment includes the adder-subtracter for subtracting the first variation value at the time of normal communication, and for adding the second variation value, which is a value larger than the mentioned first variation value, at the time of occurrence of the communication error; and the error occurrence is defined when a current value of the foregoing adder-subtracter exceeds a predetermined threshold. By setting the mentioned second variation value to a value smaller than the mentioned threshold value, it is possible to avoid too sensitive error determination with respect to a sporadic and chronic error in which an abnormal state automatically recovers; and to carry out a retransmission processing based on a history state of the past with respect to a fatal and continuous failure, and then define the error determination immediately.

However, as for the way of arrangement of the adder-subtracter, it is preferable that, for example, the lower limit value is set to "−9", an initial value to "0", and the upper limit value to "3"; and a current value of the adder-subtracter decreases to "−9" in case of continuation of normal communication, the addition to a current value is carried out in case of presence of communication error, and the error occurrence is defined when this current value exceeds the upper limit value "3".

It is also preferable that direction of the addition and subtraction is inverted, for example, a normal-side upper limit value is set to "11", an initial value to "3", and an error determination lower limit value to "0"; and a current value of the adder-subtracter increases to "11" in case of continuation of normal communication, the subtraction from a current value is carried out in case of presence of communication error, and the error occurrence is defined when this current value comes to be less than the lower limit value "0".

In the aforementioned electronic control units according to the first embodiment or the second embodiment, it is arranged such that with respect to various communication errors such as a sum check error and a timeout error due to reply delay or receiving interval error, adder-subtracter counts a current dangerous state overall, and possible number of times of the retransmission processing is also determined in a unitary manner depending on quantity of allowance up to an error determination threshold value.

However, weighting a variation value to compensate a current value of the adder-subtracter with respect to various communication errors such as sum check error and timeout error due to reply delay or receiving interval error is determined experimentally and statistically depending on practical use, and determined based on an intended degree of safety.

Accordingly, it is desirable that data of a part or all of various control constants such as the first variation value, the second variation value, the third variation value, a normal-side limit value, an abnormal-side limit value, an initial value to be processed at the mentioned first and second adder-subtracters, or data of a part or all of various control constants such as permitted value of a reply response time period or a receiving interval time period to be used at the mentioned first communication error determination means, is transferred and written from a non-volatile program memory cooperating with the main CPU so that the setting of these constants may be changed, when required.

Further, in the aforementioned electronic control unit according to the first embodiment or the second embodiment, both first and second control circuit sections are described as the ones that include a control input and a control output externally connected. For example, however, it is preferable that the second control circuit section is not provided with any external input/output, and intends to carry out monitoring control with respect to the first control circuit section.

In this case, it is preferable that a monitoring target information is transmitted from the first control circuit section to the second control circuit section, and an analysis filed information is replied from the second control circuit section to the first control circuit section. Further, in case of the presence of error in a monitoring result, this error detected by the monitoring is algebraically added to adder-subtracter for use in the mentioned communication error determination as a compensation variation value.

Furthermore., an indirect input signal that the second control circuit section transmits to the first control circuit section is not necessarily the one that transmits an ON/OFF state of the second input sensor group connected to the second control circuit section as it is. It is also possible to perform some logical connection processing at the second control circuit section and thereafter transmit the resulting signal as an indirect input signal.

Likewise, an indirect input signal that the first control circuit section transmits to the second control circuit section is not necessarily the one that drives the second electrical load group connected to the second control circuit section as it is. It is also possible to perform some logical connection processing at the second control circuit section and thereafter drive the second electrical load group.

Further, in the arrangement of the aforementioned electronic control unit according to the first embodiment or the second embodiment, the microprocessor is automatically restarted at the time of occurrence of error so as to continue the operation of the unit as further as possible. It is, however, also possible to change the arrangement so that the microprocessor is stopped at the time of occurrence of error and can be restarted only by additional manual operation.

Furthermore, it is also possible that an error occurrence time is saved, and an external tool is connected to read out and display history information as annunciation means at the time of occurrence of the error.

While the presently preferred embodiments of the present invention have been shown and described.

It is to be understood that these disclosures are for the purpose of illustration and that various changes and modifications may be made without departing from the scope of the invention as set forth in the appended claims.

What is claimed is:

1. An electronic control unit of a vehicle comprising:
   a first control circuit section provided with a program memory including input/output control means and communication control means, an operation processing RAM memory, a microprocessor cooperating with said program memory, and a first series-parallel converter; and
   a second control circuit section provided with a communication control circuit section for performing communication of a monitoring and control signal, a data memory, and a second series-parallel converter; said first control circuit section and said second control circuit section mutually carrying out serial communication of monitoring signal and control signal via said first and second- series-parallel converters;
   wherein said first control circuit section comprises regular transmission means and transmission-permitting control signal generation means, and said second control circuit section comprises confirmation reply means, regular report means, and an unprocessed data table;
   said regular transmission means is means for regularly transmitting a control output data or a constant set data from said first control circuit section to said second control circuit section, and for writing and storing an output and set data having been normally received at said second control circuit section in said data memory;
   said confirmation reply means is means for executing a confirmation reply of whether said second control circuit section has normally received or failed to receive data to be transmitted from said regular transmission means, and for requesting a retransmission processing from the first control circuit section to the second control circuit section in case of the receiving failure;
   said regular report means is means for regularly reporting a monitoring input data and status information from said second control circuit section to said first control circuit section, and for storing the-regular report data that said first control circuit section has normally received in said operation processing RAM memory;
   said unprocessed data table acts as a receiving-side command memory of a first-in first-out structure that is provided in said second control circuit section, and arranged so as to sequentially save a command data for executing said regular report and a command data for executing the confirmation reply, and to sequentially erase said saved command data when transmitting a regular report and confirmation reply data to said first control circuit section; and
   said transmission-permitting control signal generation means is control signal transmission means from said first control circuit section to said second control circuit section, by which the second control circuit section having received said control signal starts to execute the transmission of the most first-in leading command in said unprocessed data table, and adds the latest monitoring input data and status information thereto and transmits a resulting command in the case where said leading command is the regular report.

2. The electronic control unit according to claim 1, wherein said transmission-permitting control signal generation means generates said control signal, a logic level of which inverts alternately every time said first control circuit section receives the regular report or the confirmation reply data from said second control circuit section.

3. The electronic control unit according to claim 1, wherein said first control circuit section further comprises regular report permission means; and
   said regular report permission means is means for storing the a command data that is transmitted by said regular transmission means to a predetermined address of memory provided in said second control circuit section, and acts to permit said second control circuit section to transmit said regular report; and
   a normal confirmation reply responsive to said regular transmission is replaced with the transmission of the regular report when the regular report is permitted.

4. The electronic control unit according to claim 1, wherein said first control circuit section further comprises irregular transmission means;
   said second control circuit section further comprises report reply means;
   said irregular transmission means acts as readout request means that is capable of being applied when there is any error in a report communication provided by said regular report means, and that is applied when necessary so that said first control circuit section read out and confirm a monitoring input data of a specified address with respect to the second control circuit section, and may read out and check a write save data having been written and set by said regular transmission means;
   said report reply means acts as communication means which performs a report reply of a monitoring input data or a write save data of a specified address as the confirmation reply to the fact that said second control circuit section has received said irregular transmission data, and to which a readout request is made again by retransmission request means provided in the first control circuit section on the supposition of presence of any communication error in said report reply; and
   a communication command to said report reply means is stored once in said unprocessed data table, and transmitted to said first control circuit section along with a report reply data in response to said control signal provided by said transmission-permitting control signal generation means.

5. The electronic control unit according to claim 4, wherein said first control circuit section further comprises a reply-waiting data table and retransmission means;
   said reply-waiting data table acts as a transmission-side command memory arranged so as to sequentially save a transmission command that said first control circuit section has transmitted by regular transmission means and irregular transmission means to the second control circuit section; and to sequentially erase said transmission command when receiving the confirmation reply data or said report reply data from the second control circuit section; and
   said retransmission means acts as means that operates when any communication error is present in a confirmation reply or a report reply to said regular transmission means or irregular transmission means or when a leading transmission command having been stored in said transmission-side command memory is not erased even if a predetermined time period has passed, and transmits again a transmission data based on an abnormal transmission command; and a transmission command having been transmitted again is deleted from and stored again in said transmission-side command memory, thus a first-in first-out processing being carried out.

6. The electronic control unit according to claim 4, wherein said second control circuit section further comprises readout request setting means;
said readout request setting means acts as means for requesting readout of a selected data memory of a specified address, which is provided in said second control circuit section, by adding a readout request flag to status information contained in said regular report means; and said first control circuit section is arranged to operate when any communication error is present in said regular report data or when said readout request is present, and to be capable of making a readout request for a regular report content or a selected data memory by said irregular transmission means.

7. The electronic control unit according to claim 4, wherein said first and second control circuit sections further comprise first and second communication error determination means, first and second adder-subtracters and first and second error occurrence definition means respectively;
said first and second communication error determination means act as receiving error determination means for determining the presence or absence of error as to various regular and irregular communication packets, which the control circuit section on the side where said receiving error determination means is provided has received from the other control circuit section or determining a state of being incapable of receiving a communication packet to be received;
said first and second adder-subtracters act as operation means that adds or subtracts a second variation value when said receiving error determination means determines the presence of error, and subtracts or adds a first variation value when the receiving error determination means determines the absence of error to perform an addition-subtraction compensation with respect to a current value memory so as to mutually counteract; and stops an addition-subtraction compensation with said first variation value at a predetermined normal-side limit value when the determination of the absence of error continues;
said first and second error occurrence definition means act as comparison means for generating the first and second error detection signal when a current value of said adder-subtracter comes to be outside a region of a predetermined abnormal-side limit value resulted from accumulation of said first and second variation values; and
said second variation value is set to a value smaller than a permitted accumulation value, being a difference between said abnormal-side limit value and said normal-side limit value, and stopping the operation or initialization and restart of said first or second control circuit section is carried out responsive to the generation of said first and second error detection signal.

8. The electronic control unit according claim 7, wherein said first and second control circuit sections further comprise first and second initialization means;
said first initialization means acts as means that operates when said first error occurrence definition means generates the first error detection signal, resets a current value of said first adder-subtracter to a predetermined initialization value set at the start of operation, and initializes and restarts a communication control circuit section provided in said second control circuit section;
said second initialization means acts as means that operates when said second error occurrence definition means generates the second error detection signal, resets a current value of said second adder-subtracter to a predetermined initialization value set at the start of operation, and initializes and restarts a microprocessor provided in said first control circuit section, or stops the operation thereof; and
an initialization value of the first and second adder-subtracter to be reset by said first and second initialization means is a value close to said abnormal-side limit value apart from said normal-side limit value.

9. The electronic control unit according to claim 7, wherein said first and second communication error determination means further comprise at least one of bit information monitoring means, reply delay monitoring means and receiving interval monitoring means;
said bit information monitoring means acts as bit error determination means for determining the presence or absence of lack or mix in bit information such as parity check or sum check relative to a serial data communicated between said first and second control circuit sections;
said reply delay monitoring means acts as reply response error determination means for making an error determination at the control circuit section, being a source side, when a reply data from the other control circuit section in response to any data, which is transmitted by either said first or second control circuit section, cannot be received even when a predetermined reply response time period has passed;
said receiving interval monitoring means acts as receiving interval error determination means for making an error determination when a receiving interval time period at the other-side control circuit section relative to a regular transmission data that said first control circuit section transmits or a regular report data that said second control circuit section transmits, exceeds a predetermined value; and
said adder-subtracter performs an addition-subtraction compensation with a first variation value when none of said bit information monitoring means, reply delay monitoring means and receiving interval monitoring means makes an error determination.

10. The electronic control unit according to claim 9, wherein said second variation value, which said adder-subtracter adds or subtracts when the determination of said bit information monitoring means is a communication error, is a value larger than said first variation value; a variation value, which said adder-subtracter adds or subtracts when the determination of said reply delay monitoring means or receiving interval monitoring means is said communication error, is a third variation value, being a value different from said second variation value; and said third variation value is a value smaller than a permitted accumulation value, being a difference between said abnormal-side limit value and said normal-side limit value.

11. The electronic control unit according to claim 1, wherein said first control circuit section further comprises a direct input/output signal interface circuit, and
either said first or second control circuit section further comprises a watchdog timer and error occurrence storage means;
said direct input/output signal interface circuit is bus-connected to said microprocessor;

said microprocessor is arranged so as to generate an output signal in response to a direct input signal having been inputted via said direct input signal interface, an indirect input signal having been received by a serial communication from a second series-parallel converter provided in said second control circuit section, and a content of said program memory, thereby driving a first electrical load group, which is connected to said direct output signal interface circuit, and to transmit an indirect output signal via said first and second series-parallel converters to the second control circuit section;

said watchdog timer acts as a run-away monitoring timer circuit that monitors a watchdog clear signal, being a pulse train, which said microprocessor generates, and generates a reset pulse signal when a pulse width of said watchdog clear signal exceeds a predetermined value;

said error occurrence storage means acts as an error storage circuit that stores said first and second error detection signals or said reset pulse signal to bring annunciation means in operation when said error detection signals are generated and when the reset pulse signal provided by said watchdog timer is generated; and said microprocessor is initialized and restarted when said watchdog timer generates said reset pulse signal and when said second error detection signal is generated; and a communication control circuit section of said second control circuit section is initialized and restarted when said watchdog timer generates said-reset pulse signal and when said first error detection signal is generated.

12. The electronic control unit according to claim 11, wherein said second control circuit section further comprises an auxiliary CPU, and said first control circuit section further comprises run-away monitoring means with respect to said auxiliary CPU;

said auxiliary CPU acts as a microprocessor that is contained in said second control circuit section along with an auxiliary program memory cooperating with said auxiliary CPU, an operation processing auxiliary RAM memory, an indirect input/output signal interface circuit and a second series-parallel converter, transmits to the first control circuit section via said first and second series-parallel converters an indirect input signal associated with a signal having been inputted via said indirect input signal interface circuit, and drives a second electrical load group connected to said indirect output signal interface circuit by an output associated with an indirect output signal having been received from said first control circuit section via said first and second series-parallel converters;

said run-away monitoring means is means for monitoring with a microprocessor acting as a main CPU provided in said first control circuit section said watchdog clear signal, being said pulse train that said auxiliary CPU generates, and for generating said -reset pulse signal when pulse width of said watchdog clear signal exceeds said predetermined value; and when said run-away monitoring means generates said reset pulse signal, when said watchdog timer generates said reset pulse signal and when said first error detection signal is generated, said auxiliary CPU is initialized and restarted, and said error storage circuit stores the occurrence of error.

13. The electronic control unit according to claim 11, wherein said error occurrence storage means is constituted of a count storage circuit; and said count storage circuit counts an OR output with respect to said first and second error detection signals and said reset pulse signal provided by the watchdog timer, and brings said annunciation means in operation when said count value reaches a second predetermined value.

14. The electronic control unit according to claim 11, wherein at least one of said first and second control circuit sections further comprises driving stop means and clear means;

said driving stop means acts as a gate circuit that operates when said error occurrence storage means stores an error occurrence to inhibit driving specified electrical loads, being a part of said electrical load group; and said clear means acts as means for initializing an error storage signal provided by said error occurrence storage means by manual operation such as turning on a power supply switch again.

15. The electronic control unit according to claim 13, wherein at least one of said first and second control circuit sections further comprises driving stop means and clear means; said driving stop means acts as a gate circuit that operates when a count value of said count storage circuit is not less than a second predetermined value to inhibit driving specified electrical loads, being a part of said electrical load group; and said clear means acts as means for initializing a current value of said count storage circuit by manual operation such as turning on a power supply switch again.

* * * * *